(12) United States Patent
Del Sesto et al.

(10) Patent No.: US 8,930,997 B2
(45) Date of Patent: *Jan. 6, 2015

(54) METHOD AND SYSTEM TO REQUEST AUDIOVISUAL CONTENT ITEMS MATCHED TO PROGRAMS IDENTIFIED IN A PROGRAM GRID

(71) Applicant: Frontier Communications Corporation, Stamford, CT (US)

(72) Inventors: Eric E. Del Sesto, Stamford, CT (US); Tony T. Chan, Stamford, CT (US); Michael Luton, Stamford, CT (US)

(73) Assignee: Frontier Communications Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,637

(22) Filed: Mar. 1, 2013

(65) Prior Publication Data

US 2013/0247102 A1 Sep. 19, 2013

Related U.S. Application Data

(63) Continuation of application No. 12/701,558, filed on Feb. 6, 2010, now Pat. No. 8,413,187.

(51) Int. Cl.
| | | |
|---|---|---|
| *G06F 3/00* | (2006.01) | |
| *G06F 13/00* | (2006.01) | |
| *H04N 5/445* | (2011.01) | |
| *H04N 21/235* | (2011.01) | |
| *H04N 21/4725* | (2011.01) | |
| *H04N 21/462* | (2011.01) | |
| *H04N 21/231* | (2011.01) | |
| *H04N 21/482* | (2011.01) | |

(52) U.S. Cl.
CPC ....... *H04N 21/4622* (2013.01); *H04N 21/2355* (2013.01); *H04N 5/44543* (2013.01); *H04N 21/4725* (2013.01); *H04N 21/23109* (2013.01); *H04N 2005/44556* (2013.01); *H04N 21/4821* (2013.01)
USPC .................... 725/39; 725/37; 725/41; 725/54

(58) Field of Classification Search
None
See application file for complete search history.

(56) References Cited

U.S. PATENT DOCUMENTS

| | | |
|---|---|---|
| 5,210,868 A | 5/1993 | Shimada et al. |
| 5,940,073 A | 8/1999 | Klosterman et al. |

(Continued)

OTHER PUBLICATIONS

"U.S. Appl. No. 13/485,718, Examiner Interview Summary mailed Aug. 8, 2013", 3 pgs.

(Continued)

*Primary Examiner* — Oschta Montoya
(74) *Attorney, Agent, or Firm* — Schwegman Lundberg & Woessner, P.A.

(57) ABSTRACT

A method to obtain visual content items matched to scheduled programs comprising: providing a program guide display that includes a grid with grid locations that identify scheduled programs, and that correspond to respective a scheduled program air times and a respective program sources; wherein the program guide extends over a time frame prior to the current date; providing an icon associated with a grid location that indicates that a visual content item matched to the program identified by the grid location currently is available; providing an identifier that is encoded in computer readable storage device and that is associated with the grid location and that indicates a location where the visual content item can be obtained; and accessing the location indicated by the identifier in response to a user selection of the grid location associated with the icon.

21 Claims, 19 Drawing Sheets

(56) References Cited

U.S. PATENT DOCUMENTS

| | | | |
|---|---|---|---|
| 6,002,444 | A | 12/1999 | Marshall et al. |
| 6,684,400 | B1* | 1/2004 | Goode et al. ............... 725/61 |
| 6,820,135 | B1 | 11/2004 | Dingman et al. |
| 7,100,184 | B1* | 8/2006 | Kahn ........................ 725/39 |
| 7,143,076 | B2 | 11/2006 | Weinberg et al. |
| 7,325,244 | B2 | 1/2008 | Boyle et al. |
| 7,454,775 | B1 | 11/2008 | Schaffer et al. |
| 7,487,523 | B1 | 2/2009 | Hendricks |
| 7,519,982 | B1 | 4/2009 | Gordon et al. |
| 7,590,993 | B1 | 9/2009 | Hendricks et al. |
| 7,634,464 | B2 | 12/2009 | Chen et al. |
| 7,827,582 | B2 | 11/2010 | Ellis |
| 7,861,269 | B1 | 12/2010 | Mohr et al. |
| 7,904,429 | B2 | 3/2011 | Villaret et al. |
| 8,032,546 | B2 | 10/2011 | Arasu et al. |
| 8,205,227 | B1 | 6/2012 | Del Sesto et al. |
| 8,250,614 | B1* | 8/2012 | Ellis et al. ................. 725/87 |
| 8,266,649 | B2 | 9/2012 | Drazin et al. |
| 8,413,187 | B1 | 4/2013 | Del Sesto et al. |
| 2002/0038457 | A1 | 3/2002 | Numata et al. |
| 2003/0052905 | A1* | 3/2003 | Gordon et al. ............. 345/700 |
| 2003/0167253 | A1 | 9/2003 | Meinig |
| 2005/0004935 | A1 | 1/2005 | Thede et al. |
| 2005/0235332 | A1* | 10/2005 | Manson et al. ............. 725/110 |
| 2005/0278741 | A1* | 12/2005 | Robarts et al. ............. 725/46 |
| 2008/0059884 | A1 | 3/2008 | Ellis et al. |
| 2008/0271078 | A1 | 10/2008 | Gossweiler et al. |
| 2009/0025033 | A1* | 1/2009 | Stautner et al. ............ 725/39 |
| 2009/0178078 | A1* | 7/2009 | Daigle et al. .............. 725/40 |
| 2009/0184926 | A1* | 7/2009 | Kates ........................ 345/163 |
| 2010/0333133 | A1 | 12/2010 | Krakirian et al. |
| 2012/0272269 | A1 | 10/2012 | Del Sesto et al. |

OTHER PUBLICATIONS

"U.S. Appl. No. 13/485,718, Response filed Aug. 12, 2013 to Final Office Action mailed May 10, 2013", 18 pg.

"ABC.com Home Page", [online]. [retrieved Feb. 5, 2010]. Retrieved from the Internet: <URL: http://www.abc.com>, 3 pgs.

"U.S. Appl. No. 12/701,556, Notice of Allowance mailed Feb. 21, 2012", 11 pgs.

"U.S. Appl. No. 12/701,556, Preliminary Amendment filed Sep. 14, 2010", 11 pgs.

"U.S. Appl. No. 12/701,558, Notice of Allowance mailed Nov. 30, 2012", 11 pgs.

"U.S. Appl. No. 12/701,558, Preliminary Amendment filed Sep. 14, 2010", 9 pgs.

"U.S. Appl. No. 13/485,718 , Response filed Jan. 25, 2013 to Non Final Office Action mailed Oct. 25, 2012", 13 pgs.

"U.S. Appl. No. 13/485,718, Final Office Action mailed May 10, 2013", 24 pgs.

"U.S. Appl. No. 13/485,718, Non Final Office Action mailed Oct. 25, 2012", 20 pgs.

"U.S. Appl. No. 13/485,718, Response filed Feb. 28, 2013 to Non Final Office Action mailed Oct. 25, 2012", 3 pgs.

"Blinkx.com Home Page", [online]. [retrieved Feb. 5, 2010]. Retrieved from the Internet: <URL: http://www.Blinkx.com>, 1 pg.

"CastTV.com Home Page", [online]. [retrieved Feb. 5, 2010]. Retrieved from the Internet: <URL: http://www.CastTV.com>, 5 pgs.

"CBS.com Home Page", [online]. [retrieved Feb. 5, 2010]. Retrieved from the Internet: <URL: http://www.CBS.com>, 2 pg.

"Clicker.com Home Page", [online]. [retrieved Feb. 5, 2010]. Retrieved from the Internet: <URL: http://www.clicker.com, 1 pg.

"Disney.com Home Page", [online]. [retrieved Feb. 5, 2010]. Retrieved from the Internet: <URL: http://www.disney.com, 3 pgs.

"ESPN.com Home Page", [online]. [retrieved Feb. 5, 2010]. Retrieved from the Internet: <URL: http://www.ESPN.com>, 2 pgs.

"Fancast Home Page", [online]. [retrieved Feb. 5, 2010]. Retrieved from the Internet: <URL: http://www.fancast.com, 4 pgs.

"Fox.com Home Page", [online]. [retrieved Feb. 5, 2010]. Retrieved from the Internet: <URL: http://www.Fox.com, 3 pgs.

"Hulu.com Home Page", [online]. [retrieved Feb. 5, 2010]. Retrieved from the Internet: <URL: http://www.hulu.com, 1 pg.

"Mtv.com Home Page", [online]. [retrieved Feb. 5, 2010]. Retrieved from the Internet: <URL: http://www.Mtv.com, 2 pgs.

"NBC.com Home Page", [online]. [retrieved Feb. 5, 2010]. Retrieved from the Internet: <URL: http://www.nbc.com>, 2 pgs.

"PBS.com Home Page", [online]. [retrieved Feb. 5, 2010]. Retrieved from the Internet: <URL: http://www.Pbs.com>, 3 pgs.

"Pushing to Bring TV to the Internet", The Wall Street Journal, [online]. Retrieved from the Internet: <URL: http://online.wsj.com/article/SB10001424052748704022804575041070405958514.html>, (Feb. 3, 2010), 4 pgs.

"Sidereel.com Home Page", [online]. [retrieved Feb. 5, 2010]. Retrieved from the Internet: <URL: http://www.Sidereel.com>, 5 pgs.

"Television.AOL.com Home Page", [online] [retrieved Feb. 5, 2010]. Retrieved from the Internet: <URL: http://www.Television.aol.com>, 2 pgs.

"TV GUIDE.com Home Page", [online]. [retrieved Feb. 5, 2010]. Retrieved from the Internet: <URL: http://www.TVGUIDE.com>, 8 pgs.

"TV.com Home Page", [online]. [retrieved Feb. 5, 2010]. Retrieved from the Internet: <URL: http://www.tv.com>, 3 pgs.

U.S. Appl. No. 13/485,718, Notice of Allowance mailed Jun. 9, 2014, 9 pgs.

* cited by examiner

| Series Metadata Record | Item Series Title | Item Type | Item Episode Title | Item Season-Episode Number | Item Date | Item Description |
|---|---|---|---|---|---|---|
| S1 | S1 STscore | No score | No score | No score | No score | No score |
| S2 | S2 STscore | No score | No score | No score | No score | No score |
| S3 | S3 STscore | No score | No score | No score | No score | No score |

FIG. 6

| Series Metadata Record | Item Metadata Record | Item Series Title | Item Type | Item Episode Title | Item Season-Episode Number | Item Date | Item Description |
|---|---|---|---|---|---|---|---|
| S1 | I1 | S1 STscore | I1type score | I1ET score | I1se-ep score | I1 date score | I1 desc score |
| S1 | I2 | S1 STscore | I2type score | I2ET score | I2se-ep score | I2 date score | I2 desc score |
| S2 | I3 | S2 STscore | I3type score | I3ET score | I3se-ep score | I3 date score | I3 desc score |
| S2 | I4 | S2 STscore | I4type score | I4ET score | I4se-ep score | I4 date score | I4 desc score |
| S2 | I5 | S2 STscore | I5type score | I5ET score | I5se-ep score | I5 date score | I5 desc score |
| S2 | I6 | S2 STscore | I6type score | I6ET score | I6se-ep score | I6 date score | I6 desc score |
| S3 | I7 | S3 STscore | I7type score | I7ET score | I7se-ep score | I7 date score | I7 desc score |
| S3 | I8 | S3 STscore | I8type score | I8ET score | I8se-ep score | I8 date score | I8 desc score |
| S3 | I9 | S3 STscore | I9type score | I9ET score | I9se-ep score | I9 date score | I9 desc score |

FIG. 7

Guide-to-Content Match Results

| p.id | program.title | episode_title | se-ep | date | description |
|---|---|---|---|---|---|
| 141085 | Sons of Anarchy | Culling | 9-12 | 11/24/09 | Jax and Clay prepare to battle The League; A.J. learns the truth about Ethan's business dealings; Tara ensures her position at St. Thomas Hospital. |

| s.id | s.title | v.id | v.type | v.title | se-ep | date | description | score | v.type | v.date | v.se_ep | v.title | s.title | v.desc |
|---|---|---|---|---|---|---|---|---|---|---|---|---|---|---|
| 2415 | Sons of Anarchy | 114262 | (full) | Fa Guan | 2-9 | 11/03/09 | When SAMCRO's film business becomes a hindrance to the club, Clay seizes the opportunity to revive the gun-running cartel. | 10400 | +10000 | +0 | +0 | +0 | +400 | +0 |
| 2415 | Sons of Anarchy | 114933 | (full) | Potlach | 2-8 | 10/27/09 | With an already-dwindling gun supply in question, SAMCRO takes extreme measures to procure weapons for a customer. | 10400 | +10000 | +0 | +0 | +0 | +400 | +0 |
| 2415 | Sons of Anarchy | 106075 | (full) | Service | 2-11 | 11/17/09 | Chibs makes a secret deal with Agent Stahl in order to protect his wife and daughter. Opie learns the true circumstances that led to Donna's death and seeks both revenge and reconciliation. | 10400 | +10000 | +0 | +0 | +0 | +400 | +0 |
| 2415 | Sons of Anarchy | 108000 | (full) | Balm | 2-10 | 11/10/09 | While the repo business proves more fruitful than the club ever imagined, the tension between Jax and Clay forces Gemma to make a tough decision | 10400 | +10000 | +0 | +0 | +0 | +400 | +0 |
| 2415 | Sons of Anarchy | 106073 | (clip) | The Culling | 9-12 | 11/24/09 | The entire SAMCRO family goes on lockdown inside the clubhouse as Jax and Clay prepare to battle The League. A.J. Weston learns the truth about Ethan Zobelle's business dealings in Charming. Tara ensures her position at St. Thomas Hospital. | 8400 | +0 | +5000 | +2500 | +500 | +400 | +0 |
| 2415 | Sons of Anarchy | 109321 | (clip) | Recap: Potlach | 2-8 | 10/27/08 | Miss this episode? Catch up fast with this 3 minute Replay! With an already-dwindling gun supply in question, SAMCRO takes extreme measures to procure weapons for a customer. | 400 | +0 | +0 | +0 | +0 | +400 | +0 |

FIG. 9

METHOD AND SYSTEM TO REQUEST AUDIOVISUAL CONTENT ITEMS MATCHED TO PROGRAMS IDENTIFIED IN A PROGRAM GRID

CROSS REFERENCE TO RELATED APPLICATION

This application is a continuation of U.S. patent application Ser. No. 12/701,558, filed Feb. 6, 2010, which application is related to that of commonly owned patent application Ser. No. 12/701,556, filed on Feb. 6, 2010, which applications are incorporated herein by reference in their entirety.

BACKGROUND OF THE INVENTION

In the field of television broadcasting, electronic program guides (EPGs) are software programs that reside inside cable TV and satellite set-top boxes, and inside TVs. An EPG displays a user interface that allows the viewer to interactively browse and search through listings of television programs which will be aired on a specific list of television channels on a specific range of dates. An EPG typically employs a program database, which describes, for each Program, the specific time it will air and the program source or channel it will air on. Program databases are generally assembled via a manual and/or automated process of collecting the program information from each television broadcaster.

Recently, the Internet has become a popular source of audiovisual content. Content Publishers such as television broadcasters, movie studios, web-only video publishers, and other publishers offer content often in a video format for download and/or streaming delivery from their web sites and/or FTP sites. Content Aggregators discover, index, and republish or provide URL links to the available audiovisual content, typically video content, from multiple Content Publishers, on their web sites. A Content Aggregator typically uses an automated process to retrieve each Content Publisher's list of available audiovisual content (e.g., video content). Such a list typically comprises the metadata for each audiovisual content item such as its series and episode titles, air date, season and episode numbers, provider, duration, rating, a brief description and the URL or other identifier to indicate where the file containing the content can be downloaded from and/or the streaming can be requested from. A Content Aggregator will typically store this metadata information in a visual content item metadata database.

A Content Aggregator's web site may provide the site visitor with multiple methods to find visual content items, (e.g., videos) including an item search feature, browse by title, browse by category/genre, browse by publisher, etc. Another method is to provide a list of videos organized by the specific date on which that television program or movie was first aired or re-aired. This list may consist of a list of videos organized by day of the week, or a two-dimensional EPG-like grid or table using Channels and Times as its two axis.

The challenge in implementing this type of time-based Guide is that although a program database typically indicates which programs were aired on a specific date, it does not provide information regarding the availability of visual content items (e.g., videos) for download or streaming. Conversely, although a visual content item metadata database typically indicates a visual content item's availability for download or streaming, it may omit or include inaccurate air-date or program source information.

These and other features and advantages will be apparent from the following description of illustrative embodiments in conjunction with the drawings.

BRIEF DESCRIPTION OF THE DRAWINGS

FIG. 6 is an illustrative drawing of program-series match records produced by the process of FIG. 5.

FIG. 7 is an illustrative drawing of program-video match records produced by the process of FIG. 5.

FIG. 9 is an illustrative drawing showing a second example program metadata record and multiple example content item metadata records and their corresponding content item match score records.

DESCRIPTION OF THE EMBODIMENTS

Figure 1:
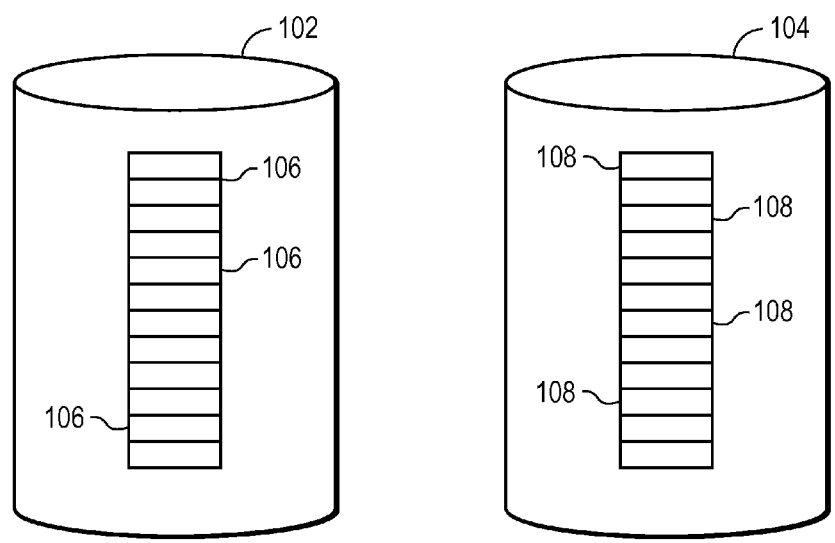
FIG. 1 is an illustrative drawing showing a program metadata database and a visual content item metadata database.

The following description is presented to enable any person skilled in the art to create and use a system and method to manage and deliver audiovisual content items, such as videos, that correspond to scheduled programs and is provided in the context of particular uses and their requirements. Various modifications to the disclosed embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Introduction

The term 'program' as used herein refers to visual or audiovisual content that is presented using a display system in a series of images to convey the appearance of motion or to represent a sequence of still images representing scenes in motion and that is scheduled for delivery through mass distribution over any of a variety of distribution networks including cable, internet, and satellite and terrestrial television broadcast systems. A program's content may include movies or motion pictures films and television (TV) episodes, for example.

The terms 'visual content item', 'visual item' and 'item' as used herein refer to visual or audiovisual content that is encoded in a machine readable storage device and that is presented using a display system in a series of images to convey the appearance of motion or to represent a sequence of still images representing scenes in motion and that is available in inventory. A visual content item may be accessed individually through streaming from an internet web site, downloading from a web site or FTP site, or retrieval from a database or local storage system, for example. A video recording or video is one example of a visual content item. A visual content item's content may include movies or motion pictures films and television (TV) episodes, for example.

The same visual or audiovisual content may be presented as a program or as a visual content item. Thus, a user may have a choice of watching a program presentation that contains certain visual or audiovisual content, e.g., a television episode, or watching a visual content item presentation that contains the same visual or audiovisual content. Well established protocols exist to inform the viewing public of the scheduling of programs. For instance electronic program guides (EPGs) and Interactive Electronic Program Guides (IEPGs) are routinely distributed that provide a 'grid' to inform program viewers of the program source or channel and scheduled time that a program is to be presented. A viewer may want to access a visual content item to watch visual or audiovisual content that is the same as or a close match to that of a program at some time other than the program's scheduled viewing time.

Thus, there has been a need to designate visual content items that correspond to programs. In accordance with one aspect of some embodiments, program metadata that includes attribute information used to identify programs is compared with visual content item metadata that includes attribute information used to identify visual content items. In accordance with another aspect of some embodiments, a user interface display is provided that associates programs with identifiers used to obtain matching visual content items.

Matching Program Metadata with Audiovisual Content Metadata

FIG. 1 is an illustrative drawing showing a first program metadata database 102 and a first visual content item metadata database (a first 'item' metadata database) 104. The first program metadata database 102 includes a plurality of respective program metadata records 106 corresponding to respective programs. The first item metadata database 104 includes a multiplicity of respective item metadata records 108 that correspond to respective visual or audiovisual content that is or may be available in inventory over a network such as through streaming over the internet, or through a file download or through retrieval from storage such as disk or a database, for example.

In some embodiments, program metadata records are obtained using known automated processes. Metadata records may be provided in different file formats such as binary, text, XML, CSV, DB records, for example. Any of a variety of methods can be used to obtain the metadata records such as reads from an RSS feed, reads from an FTP site, reads from web site (HTTP/HTTPS), reads from database, reads from file system, for example. In some embodiments, the first program metadata database includes all programs that air on the current day and 14 days going back and 14 days going forward. If a program airs more than once during this time frame, it is typically but not always represented by a single program metadata record. Program metadata may include the air date and air time, for each time zone, and runtime or duration of the audiovisual content, or that metadata may be provided in a separate events record The program metadata records 106 and the visual content item metadata records 108 each contain respective attribute information that is descriptive of the respective programs or videos to which they correspond. The following Table 1 sets forth some typical attribute information of the program metadata records in accordance with some embodiments.

TABLE 1

| Program series title | Program episode title | Program season-episode numbers | Program date | Program description |
| --- | --- | --- | --- | --- |

The following Table 2 sets forth some typical attribute information of the visual content item metadata records in accordance with some embodiments.

TABLE 2

| Item series title | Item type | Item episode title | Item season-episode numbers | Item date | Item description |
| --- | --- | --- | --- | --- | --- |

Figure 2:
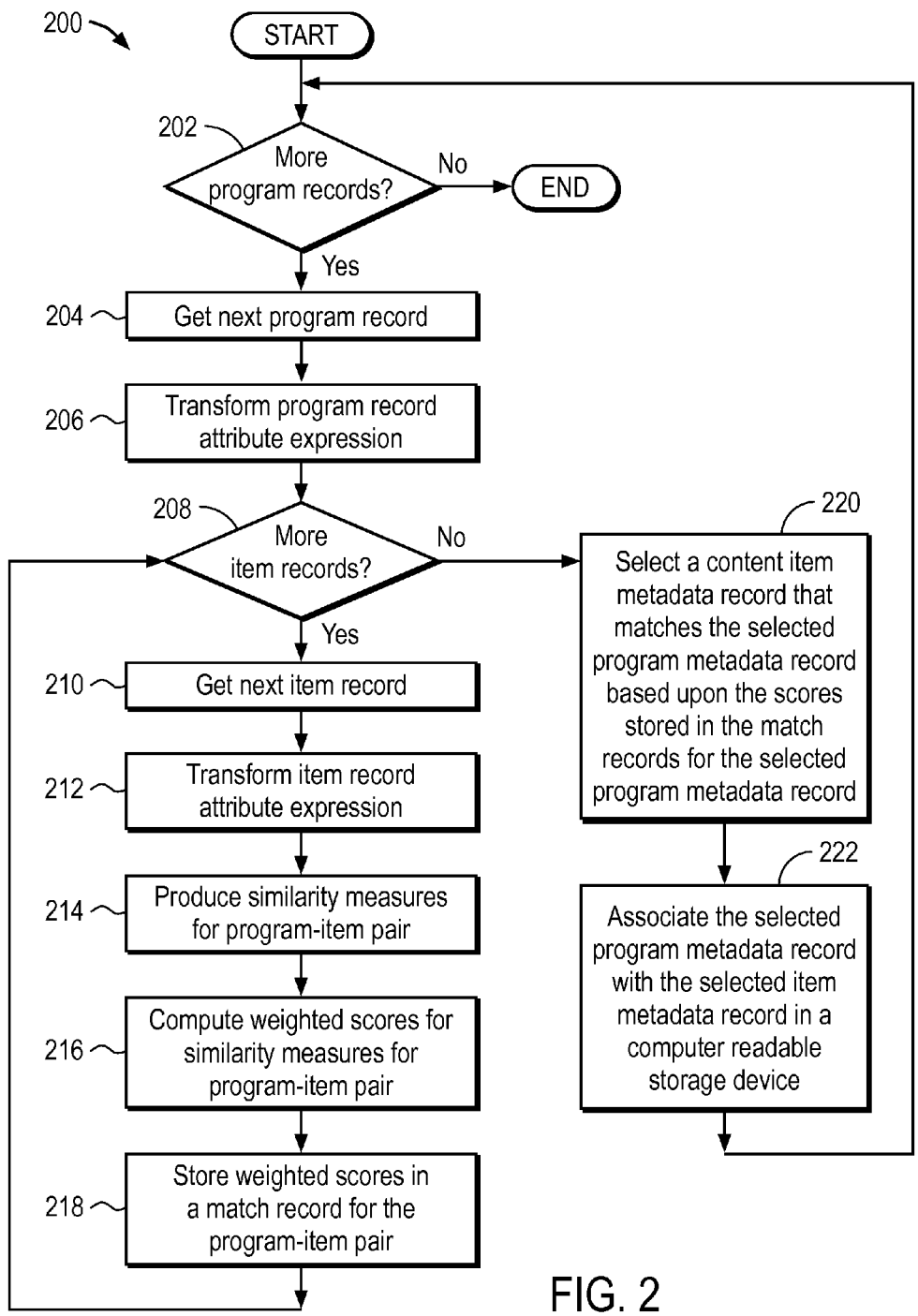
FIG. 2 is an illustrative drawing of a process to determine matches between respective program metadata records from the program metadata database and respective visual content item metadata records from the visual content item metadata database.

FIG. 2 is an illustrative drawing of a first process 200 to determine matches between respective program metadata records 106 from the program metadata database 102 and respective visual content item metadata records 108 from the first visual content item metadata database 104. In general, for a typical 14 day period the program metadata database 102 contains about 50,000 metadata records covering 2000 channels/sources. The content item metadata database typically includes about 10-100 item metadata records from a small publisher/local affiliate TV station, 1000-20,000 item metadata records from a national network, and 10,000-100,000 item metadata records from Studios, Publishers and Aggregators. The flow diagram of FIG. 2 includes a plurality of modules, each representing an aspect of the process 200 that configures machine to perform a specified function of such module. The modules are implemented using computer program codes stored in a computer readable storage device. In decision module 202, a determination is made as to whether there are additional program metadata records 106 in the first program metadata database 102 that have not yet been processed for matching against one or more item metadata records 108 of the first item metadata database 104. When at least one additional program metadata record remains to be processed, module 204 configures the machine to select a next program metadata record for match processing. Module 206 configures the machine to perform one or more transformations of the metadata attributes of the selected program metadata record. The transformations may involve changing the expression or representation of attributes to hide or remove extraneous or irrelevant differences so as to get at the core meaning of the expression. Decision module 208 configures the machine to determine whether there are additional visual content item metadata records 108 in the first program metadata database 104 that have not yet been processed for matching against program metadata record 106 currently selected by module 204. When at least one additional item metadata record remains to be processed, module 210 configures the machine to select a next item metadata record for match processing. Module 212 configures the machine to perform one or more transformations of the metadata attributes of the selected item metadata record.

Module 214 configures the machine to compare respective attributes of the selected program metadata record with corresponding respective attributes of the visual content item metadata record and produces respective values representing similarity measures for one or more of the corresponding attributes. Module 216 configures the machine to produce weighted scores for one or more corresponding attributes of the selected program metadata record and the selected visual content item metadata record based upon the similarity measures. As explained below scores may not be produced for all corresponding attributes. Module 218 configures the machine to produce a match record (not shown) for the currently selected program-visual content item metadata pair, which is stored in a computer readable storage device.

The process 500 next returns to decision module 208, which again configures the machine to determine whether there are additional item metadata records 108 in the item metadata database 104 that have not yet been processed for matching against the program metadata record 106 currently selected by module 204. If there are, then the process 500 once again proceeds to module 210, and the processing of modules 212-218 is performed for a next selected visual content item metadata record. If there are not, then module 220 configures the machine to select a visual content item metadata record that matches the currently selected program metadata record based upon the scores within the stored match records (not shown) that have been stored for the currently selected program metadata record. In some embodiments, module 222 configures the machine to create in computer readable storage an association (not shown) such as a reference or link, between the selected visual content item metadata record and the currently selected program metadata record. Alternatively, in other embodiments module 222 configures the machine to cause the display or rendering of a user interface (UI) display selector (not shown) that corresponds to a content item that corresponds to the selected visual content item metadata record. Next, decision module 202 once again configures the machine to determine whether there are additional program metadata records 106 in the first program metadata database 102 that have not yet been processed for matching against one or more visual content item metadata records 108 of the visual content item metadata database 104. If there are, then the process once again proceeds to module 204. If there are not, then the process 200 ends.

Figure 3:
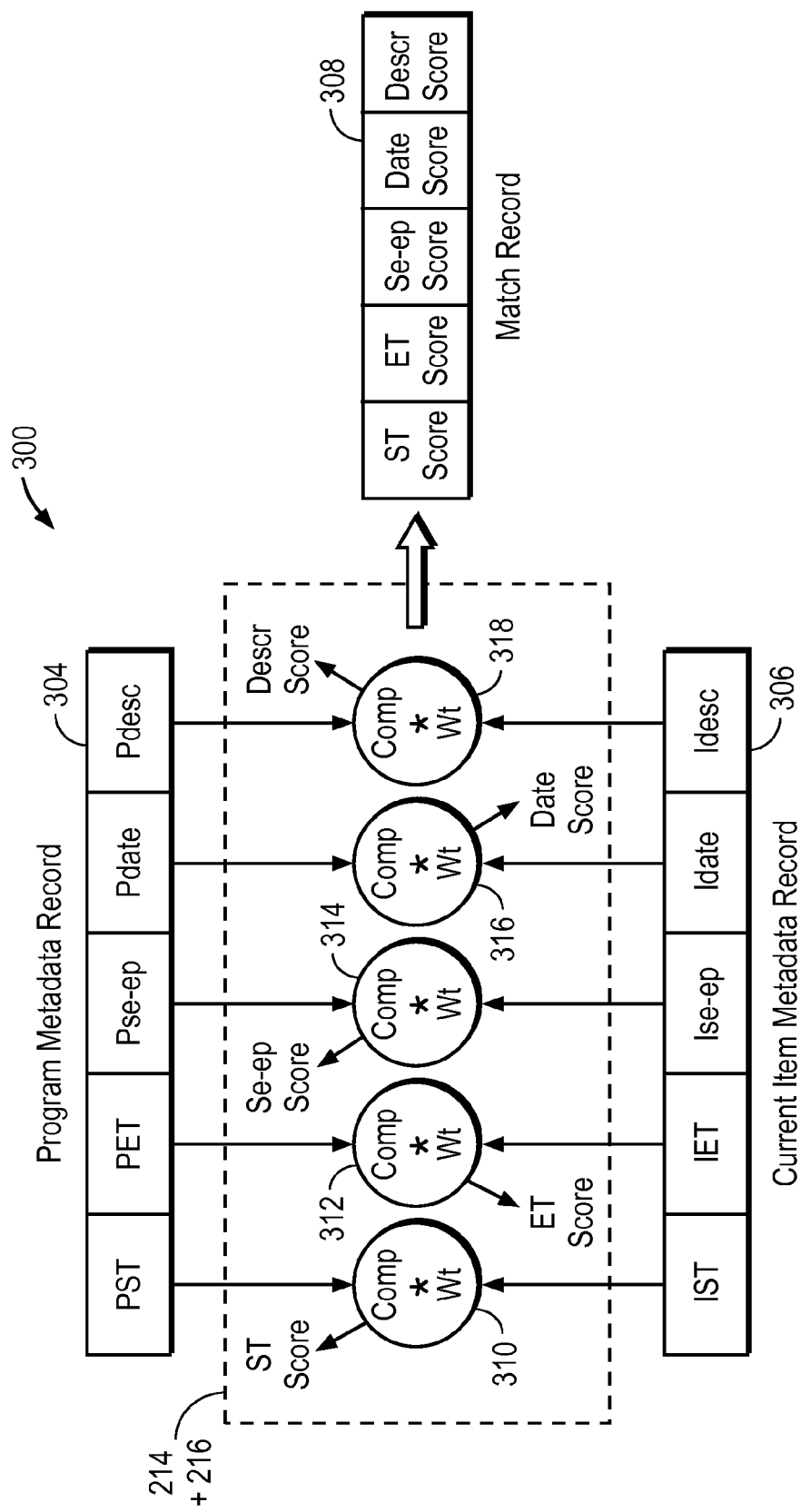
FIG. 3 is an illustrative diagram showing a configuration of a computer system to produce individual weighted similarity measurement scores for corresponding attributes of a pair comprising a currently selected program metadata record and a currently selected visual content item metadata record consistent with the process of FIG. 2.

FIG. 3 is an illustrative diagram showing a configuration 300 within a computer system to produce individual weighted similarity measurement scores for corresponding attributes of a pair comprising a currently selected program metadata record 304 and a currently selected visual content item metadata record 306 consistent with the process of FIG. 2. The scores are placed within a match record 308 corresponding to the currently selected program metadata record pair. A first comparison and weighting module 310 configures the machine to compare a program series title (PST) attribute with a video series title (IST) attribute and to produce a series title (ST) score. A second comparison and weighting module 312 configures the machine to compare a program episode title (PET) attribute with a video series title (IET) attribute and to produce an episode title (ET) score. A third comparison and weighting module 314 configures the machine to compare program season and episode numbers (Pse-ep) attribute with a video season and episode numbers (Ise-ep) attribute and to produce a season and episode numbers (se-ep) score. A fourth comparison and weighting module 316 configures the machine to compare a program date (Pdate) attribute with a video date (Idate) attribute and to produce a date score. A fifth comparison and weighting module 318 configures the machine to compare a program description (Pdesc) attribute with a video description (Idesc) attribute and to produce a description (descr) score. It will be appreciated that, as indicated with dashed lines in FIG. 3, the first through fifth comparison and weighting modules 310-318 of FIG. 3 correspond to modules 214 and 216 of the process 200 of FIG. 2. It will be appreciated that although processes of modules 214-216 of FIG. 2 are shown as being separate, the similarity measure and weighting may be achieved though unified computation as indicated in FIG. 3. The scores computed by modules 310-318 are stored within the match record 308 shown in FIG. 3 in accordance with module 218 of FIG. 2. It will be appreciated that an additional match record 308 is created during each pass of the process of 200 of FIG. 2 through modules 214, 216 and 218.

The embodiment of FIG. 3 shows respective weighted similarity scores computed as a function of a respective comparison measure (Comp) and a respective weight (Wt). Specifically, the function involves multiplication: Comp*Wt. However it will be appreciated by persons skilled in the art that weighted similarity scores may be computed based upon other different functions that may involve addition or subtraction or division or some combination that serves to scale similarity scores based upon some measure of importance or reliability of a particular attribute, for example.

Figure 4:
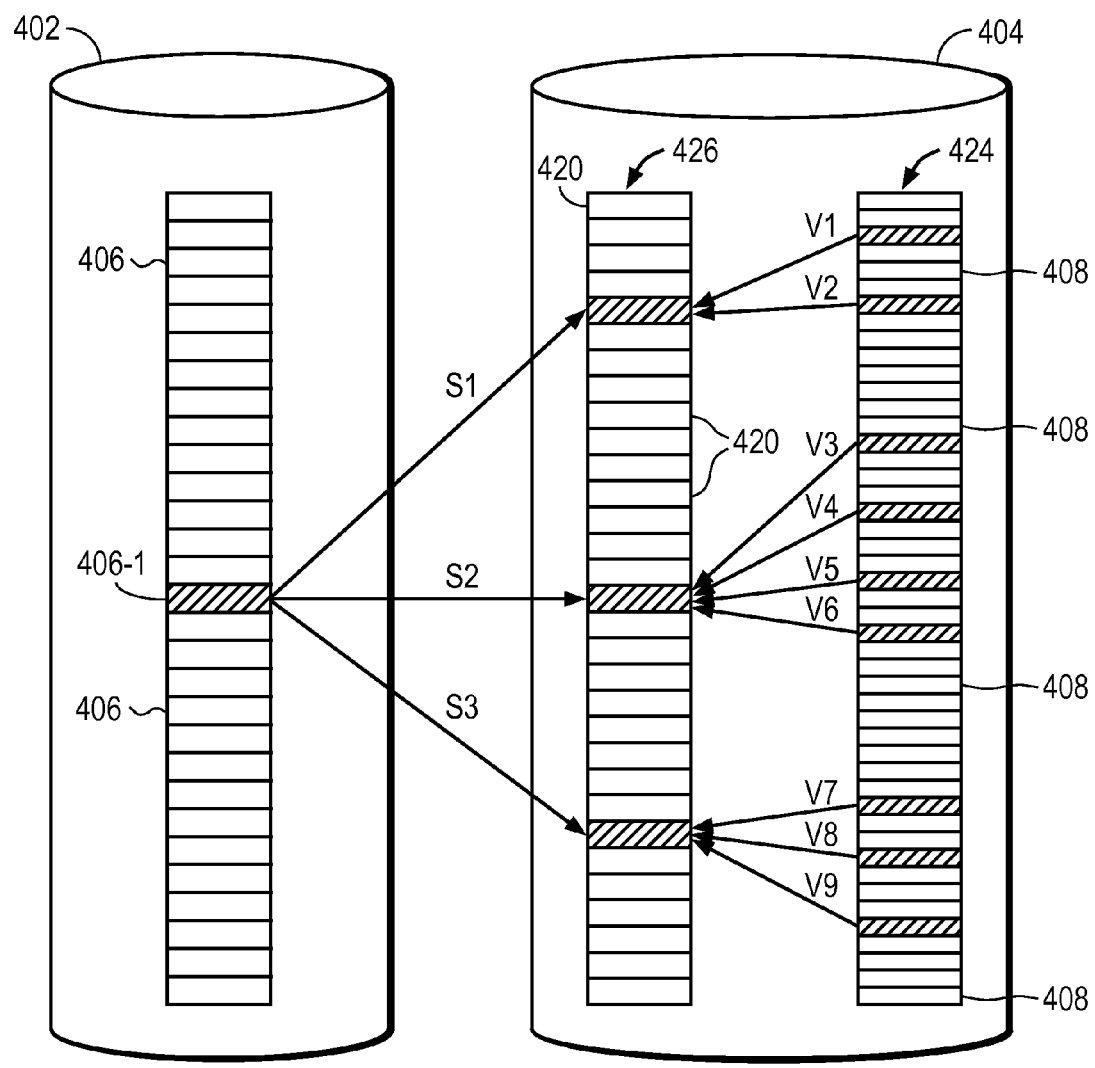
FIG. 4 is an illustrative drawing showing a program metadata database and a visual content item metadata database that contains both series metadata records and visual content item metadata records.

FIG. 4 is illustrative drawing showing a second program metadata database 402 and a second visual content item metadata database 404. The second program metadata database 402 includes a plurality of respective program metadata records 406, within a table 418, each corresponding to respective programs. The second visual content item metadata database 404 includes a multiplicity of visual content item metadata series records 420 each corresponding to a visual content item series, which includes one or more visual content item episodes. The visual content item metadata database 404 includes a multiplicity of respective visual content item metadata records 408 that correspond to respective items that are or may be available in inventory.

More particularly, in some embodiments, the second program database 402 of FIG. 4 includes one program metadata record 406 per program. In some embodiments a program metadata record 406 includes the attribute information of the type in the following Table 3:

TABLE 3

| Format | Attribute |
| --- | --- |
| String | series_title |
| String | episode_title |
| String | episode_description |
| Integer | season_number |
| Integer | Episode_number |
| Date | original_air_date |
| Datetime | start_time |
| Integer | duration |
| integer | source_id |
| string | program_type |

The visual content item metadata database of FIG. 4 contains one visual content item metadata record 408 per visual content item in a table 424. In some embodiments a visual content item metadata record 408 includes the attribute information of the type in the following Table 4:

TABLE 4

| Format | Attribute |
| --- | --- |
| string | episode_title |
| string | episode_description |
| integer | season_number |
| integer | episode_number |
| date | original_air_date |
| integer | duration |
| string | video_type |
| string | stream_url |
| integer | series_id |

Each item record 408 points to one and only one series metadata record 420 in a series table 426. There maybe a series metadata record 420 per TV Series or per movie. In some embodiments series metadata records 420 include the attribute information in the following Table 5:

TABLE 5

| Format | Attribute |
| --- | --- |
| string | series_title |
| string | series_description |

In the example visual content item metadata database arrangement of FIG. 4, two visual content item metadata records 408 indicated by arrows V1 and V2 are known to be associated within the second visual content item metadata database 404 with the series metadata record indicated by arrow S1. Four visual content item metadata records 408 indicated by arrows V3-V6 are known to be associated within the second visual content item metadata database 404 with the series metadata record indicated by arrow S2. Three visual content item metadata records 408 indicated by arrows V7-V9 are known to be associated within the second visual content item metadata database 404 with the series metadata record indicated by arrow S3. Continuing with this example, the process 500 of FIGS. 5A-5B, described below, can determine that a given program metadata record 406-1 within the program metadata database 402 has a program series title that matches video series titles of three series metadata records 420 as indicated by arrows S1, S2 and S3. The process 500 of FIGS. 5A-5B uses the known associations between the series metadata records identified by arrows S1-S3 to determine that program metadata record 406-1 is most likely to match one of visual content item metadata records V1-V9, thus obviating the need to evaluate all potential matches with other visual content item metadata records.

Figure 5A:
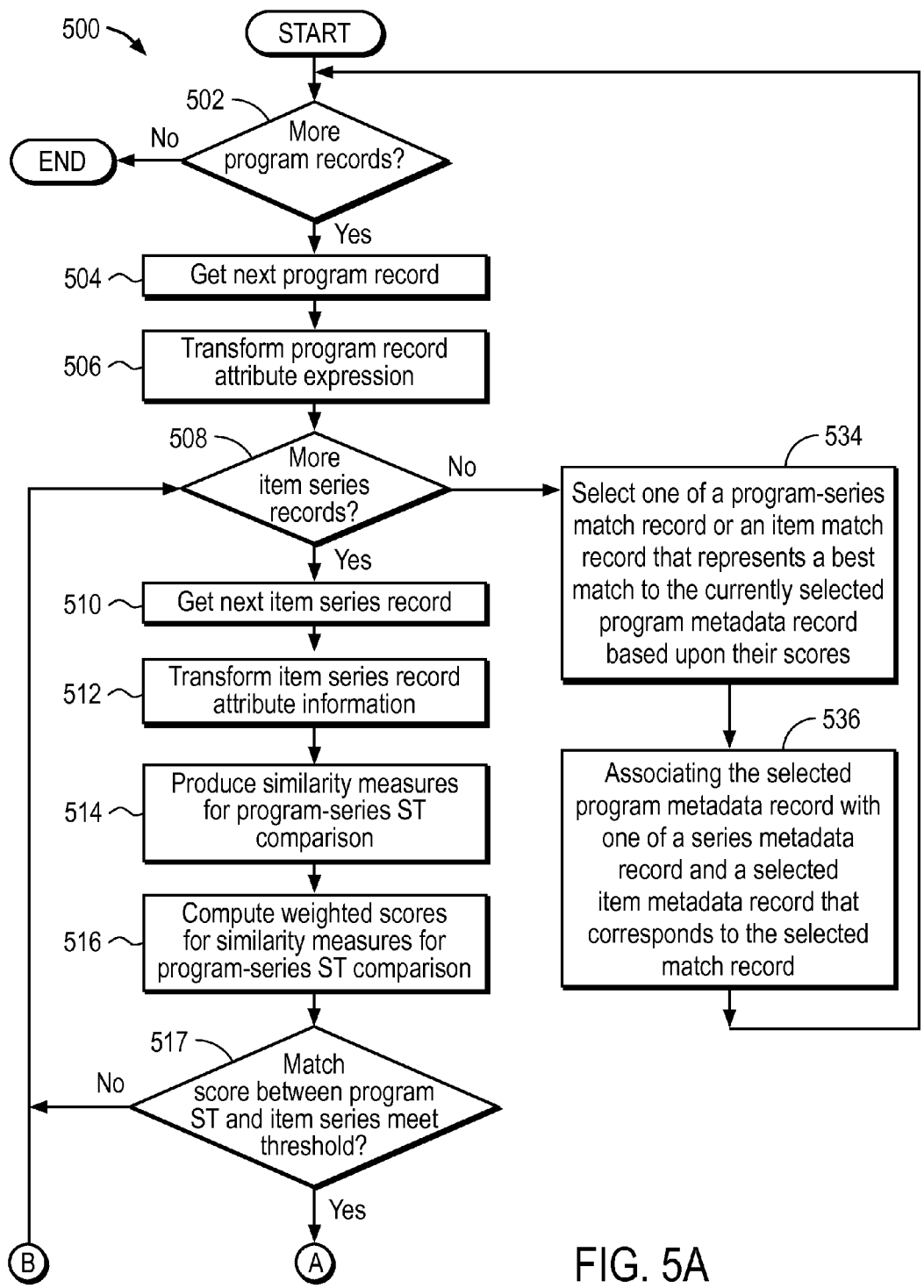
FIGS. 5A-5B are illustrative drawings of a process to determine matches between respective program metadata records from the program metadata database and respective series metadata records and visual content item metadata records from the visual content item metadata database 404.
Figure 5B:
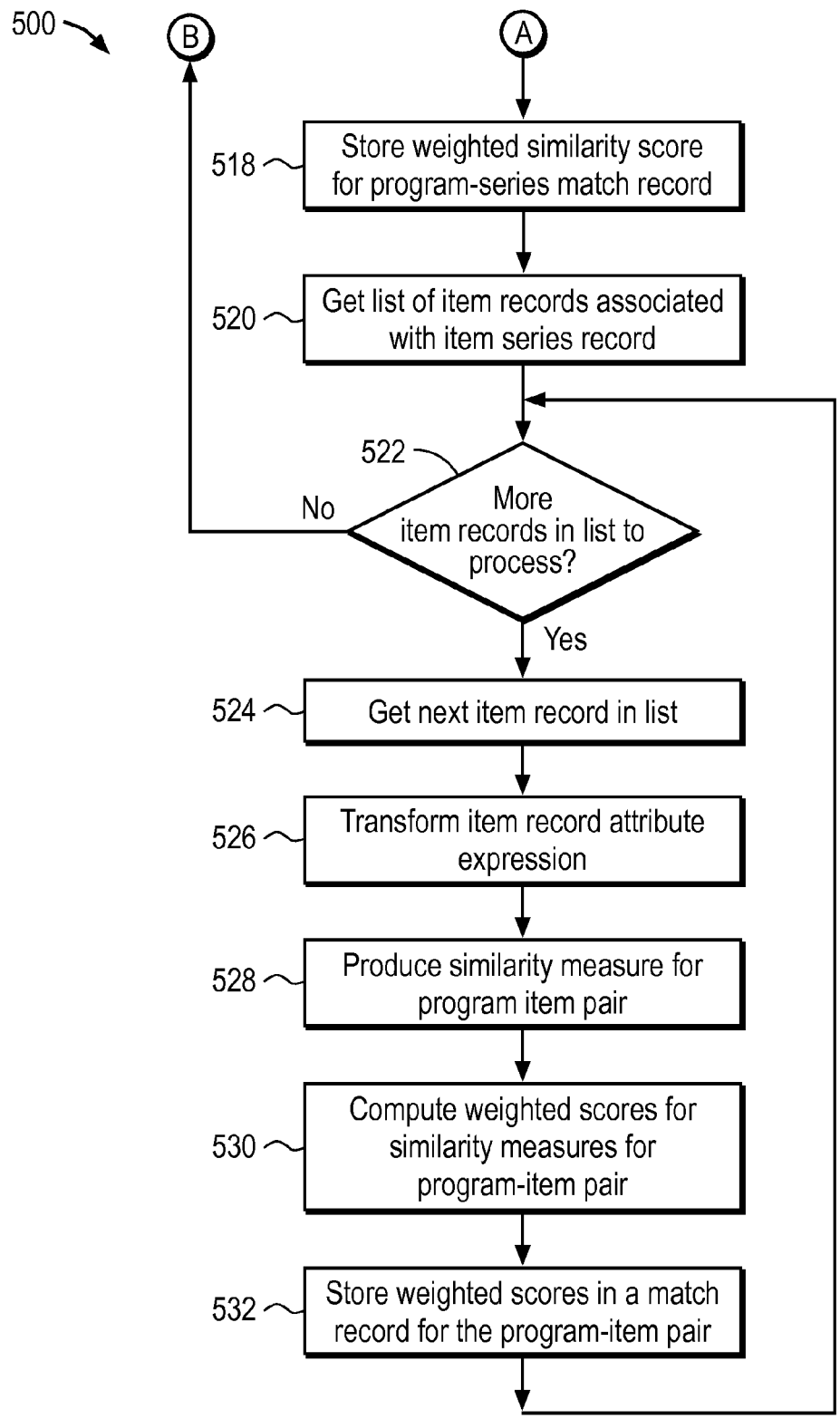

FIGS. 5A-5B are illustrative drawings of an alternative embodiment process 500 to determine matches between respective program metadata records 406 from the second program metadata database 402 and respective series metadata records 420 and visual content item metadata records 408 from the second visual content item metadata database 404. The flow diagram of FIGS. 5A-5B includes a plurality of modules, each representing an aspect of the process 500 that configures machine, e.g. a computer processor (not shown) to perform a specified function of such module. The modules are implemented using computer program codes stored in a computer readable storage device. The alternative process 500 of FIGS. 5A-5B is similar to the process 200 of FIG. 2. However the process alternative process 500 uses a series metadata structure 426 of FIG. 4 to aid in the correlation of program metadata records with item metadata records.

Decision module 502 configures the machine to determine whether additional program metadata records remain that have not yet been processed for matches. If there are more program metadata records to be processed then module 504 configures the machine to select a next program metadata record. Next, module 506 configures the machine to perform one or more transformations of the metadata attributes of the selected program metadata record as generally described above.

Decision module 508 configures the machine to determine whether more visual content item series metadata records of table 426 remain that have not yet been processed for matches with the currently selected program metadata record. If there are additional visual content item series metadata records to be processed then module 510 configures the machine to select a next visual content item series metadata record. Module 512 configures the machine to perform one or more transformations of the metadata attributes of the selected visual content item series metadata record as generally described above.

Module 514 configures the machine to produce similarity measures for program-series ST comparisons. Module 516 configures the machine to produce a weighted series title similarity score for the current program-series metadata record pair. Decision module 517 configures the machine to determine whether there is a match between the program series title attribute of the currently selected program metadata record and the visual content item series title attribute of the currently selected visual content item series metadata record. If there is no match, then process control flows back to decision module 508, which once again configures the machine to determine whether more visual content item series metadata records have not yet been processed for matches with the currently selected program metadata record. Module 518 configures the machine to store the weighted series title similarity score in a program-series match pair record corresponding to the currently selected pair of program and visual content item metadata records. Module 520 configures the machine to get a list of visual content item metadata records associated with the currently selected series metadata record.

Decision module 522 configures the machine to determine whether there are visual content item metadata on the list obtained by module 520 that have not yet been processed for matches with the currently selected program metadata record. If not, then process control flows to decision module 508. However, if additional visual content item metadata records on the list remain to be processed for matches, then module 524 configures the machine to select a next video attribute record. Module 526 configures the machine to perform one or more transformations of the metadata attributes of the selected visual content item metadata record as generally described above. Module 528 configures the machine to compare respective attributes of the selected program metadata record with corresponding respective attributes of the visual content item metadata record and to produce respective values representing similarity measures for one or more of the corresponding attributes. Module 530 configures the machine to produce weighted scores for one or more corresponding attributes of the selected program metadata record and the selected visual content item metadata record based upon the similarity measures. Module 532 configures the machine to produce a match record (not shown) for the currently selected program-visual content item metadata pair which is stored in a computer readable storage device.

Next, decision module 522 once again configures the machine to determine whether there are visual content item metadata records on the list obtained by module 520 that have not yet been processed for matches with the currently selected program metadata record. If there are, then control again flows to module 524. If there are not, then control flows to decision module 508. Assuming that decision module 508 determines that there are no further video series records in table 426 that remain to be compared with the currently selected program metadata record, module 534 configures the machine to select one of a series metadata record or a visual content item metadata record as matching the currently selected program metadata structure based upon the scores stored pursuant to module 518. In some embodiments, module 536 configures the machine to associate the currently selected program metadata record in computer readable storage with the selected video series or visual content item metadata record. Alternatively, in other embodiments module 536 configures the machine to cause display or rendering of a UI icon (not shown) that represents the selected the selected video series or visual content item metadata record. Control flows once again to decision module 502. If there are no further program metadata records to process, then process 500 ends. Otherwise, control flows again to module 504.

In some embodiments, modules 516-518 and 528-532 of the process 500 of FIGS. 5A-5B employ the configuration of the process FIG. 3.

FIG. 6 is an illustrative drawing of respective example program-series match records produced by the process 500 of FIGS. 5A-5B for the matching of program metadata record 406-1 with respective series metadata records indicated by arrows S1, S2 and S3. Each program-series match record has a weighted similarity score for the series title comparison, but no score is determined for any other attribute. It will be appreciated that in this context, the series metadata records serve as an index in to the visual content item metadata table 424. A determination of series title matching in decision module 514 is used to identify visual content item metadata records associated with a series metadata record that are most likely to have a close match to a given program metadata record. Unnecessary processing effort is avoided by not performing other attribute comparisons for the series metadata records.

FIG. 7 is an illustrative drawing of example program-video match records produced by the process 500 of FIGS. 5A-5B for the matching of program metadata record 406-1 with respective visual content item metadata records indicated by arrows V1 to V9. The series title score for each visual content item metadata record is the same as that of the series metadata record with which it is associated. Also, in this example, each visual content item metadata record has a score for each attribute. The program-series match record scores of FIG. 6 and the program-video match record scores of FIG. 7 are evaluated as explained in more detail below to select a match with the given record, 406-1, in this example.

Transformation of Metadata Records

For each program metadata record, module 206 of FIG. 2 and module 506 of FIG. 5A generate multiple progressive transformations of the program episode title, which are referred to as:

Program.episode_title1 transformation
Program.episode_title2 transformation
Program.episode_title3 transformation The multiple transformations convert the program episode title through multiple transformation levels, three levels in this embodiment. The transformations are progressive in that each transformation transforms a prior level transformation to a next level transformation.

In some embodiments, the program title transformation proceeds as follows.

To produce the Program.episode_title1 transformation, starting with the program_episode_title text string within the program metadata record, convert all characters to lowercase letters; trim space characters from start and end; and remove sequences of two or more space characters. Thus, an original expression of a program episode title attribute is converted to a second level expression of the program episode title attribute that complies with a prescribed string format.

To produce the Program.episode_title2 transformation, starting with the Program.episode_title1 transformation, remove all punctuation characters, and replace selected string sequences, for example "no."→"#", "criminal intent"→"ci". Human intervention may be involved with inserting certain content-specific transformations such as well known abbreviations for a program title. Thus, the second expression of a program title attribute is converted to a third level expression of the program title attribute that complies with a prescribed string format.

To produce the Program.episode_title3 transformation, starting with the Program.episode_title2 transformation, remove all space characters and sequences of two or more same-letter sequences (e.g., to fix typos like "Friendds"). Thus, the third expression of a program title attribute is converted to a fourth level expression of the program title attribute that complies with a prescribed string format.

Similarly, for respective program metadata records, multiple progressive transformations of the program series title are generated, which are referred to as:

Program.series_title1 transformation
Program.series_title2 transformation
Program.series_title3 transformation The program series title transformation process is the same as that described above for transformation of program titles.

Likewise, for respective visual content item series metadata records, module 212 of process 200 of FIG. 2 and module 512 of FIG. 5A generates multiple progressive transformations of the series title, which are referred to as:

Content item.series_title1 transformation
Content item.series_title2 transformation
Content item.series_title3 transformation The content item series title transformation process is the same as that described above for transformation of program titles.

In a like manner, for respective visual content items, module 212 of process 200 of FIG. 2 and module 526 of process 500 of FIG. 5A, generate multiple progressive transformations of the episode title, which are referred to as:

Content_item.episode_title1 transformation
Content_item.episode_title2 transformation
Content_item.episode_title3 transformation The content item episode title transformation process is the same as that described above for transformation of program titles and series titles.

Comparing and Scoring Title Attribute Similarities

The following Table 6 sets forth similarity scoring for title comparisons in accordance with some embodiments. The scoring is the same for comparisons of program series titles with item series titles and for comparisons of program episode titles with item episode titles. Matches at higher transformation levels are indicative of greater similarity between titles than matches at lower transformation levels. Accordingly, higher match scores for higher level title matches are indicative of greater similarity between titles than are match scores for lower level matches.

Also, an additional title 'contained within' title similarity comparison may be performed that ascertains whether an entire program series title is contained within a given item series title or a program episode title is contained within a given item episode title. Specifically, in accordance with some embodiments, if the program metadata record series title (or program metadata record episode title, whichever one is being compared) contains some threshold number of characters, at least six characters in some embodiments, and a respective content item's metadata record series title or a content item's metadata record episode title (whichever is being compared) contains the entire program title, then a 'contained within' similarity match score is provided.

If there is no title match at any transformation and there is no 'contained within' match, then the title match score is zero (0).

TABLE 6

| Transformation level | Title Similarity Score |
| --- | --- |
| Level 1 | 4 |
| Level 2 | 3 |
| Level 3 | 2 |
| Contained within | 1 |
| No match | 0 |

Comparison through multiple transformation levels proceeds as follows for both program metadata record series title to content item metadata record series title comparisons and for program metadata record episode title to content item metadata record episode title comparisons. Program series title to content item series title comparisons are discussed with reference to module 514 in FIG. 5A and also with reference to module 310 of FIG. 3. Program episode title to content item episode title comparisons are discussed with reference to module 214 of FIG. 2 and module 528 of FIG. 5A and also with reference to module 312 of FIG. 3.

More particularly, for a given program record in the program metadata database 418, the title comparison process compares the program metadata record title (whether series title or episode title) with the content item metadata record title (whether series title or episode title). The title comparison process determines whether there is a match of program title and content item title at a first transformation level. If there is a match at a first title transformation level, then the title comparison process ends (for that particular program-item or episode title comparison), and indicia of a title match, including a title match score (e.g., 4) indicative of a first transformation level (Level 1) match, is stored in a content item match record or a content item series match record (depending upon whether a series or item comparison is being made) within a computer readable storage device. If there is no first transformation level title match, then the title comparison process determines whether there is a match of program title and content item title at a second transformation level (Level 2). If there is a match at the second title transformation level then the title comparison process ends, and indicia of a title match, including a title match score (e.g., 3) indicative of a second transformation level match, is stored in a content item match record within a computer readable storage device. If there is no second transformation level match then the title comparison process determines whether there is a match of program title and content item title at a third transformation level (Level 3). If there is a match at the third title transformation level then the title comparison process ends, and indicia of a title match, including a title match score (e.g., 2) indicative of a second transformation level match, is stored in a content item match record within a computer readable storage device. If there is no third title transformation level match then the title comparison process determines whether there is a 'contained within' match of program title and content item title. If there is a 'contained within' match then indicia of a 'contained within' match, including a title match score (e.g., 1) is stored in a content item match record within a computer readable storage device. If there is no 'contained within' title transformation level match, then the title match score is zero (0). This same process occurs for each comparison of a program series title with a content item series title and for each comparison of a program episode title with a content item episode title.

Scoring Content Metadata Item Type Attribute

An audiovisual content item metadata record having a Type attribute indicative of a 'full episode' is scored with a similarity measure of one (1). Otherwise, the Type attribute similarity is scored (0). As explained more fully below, the Type scores is not indicative of similarity but rather is used to sort match records corresponding to 'full' items from match items corresponding to 'clips', for example.

Scoring Season Number/Episode Number Attribute Similarity

An audiovisual content item metadata that record has 'se-ep' attribute that matches the se-ep attribute of a program metadata record is scored one (1). Otherwise, the se-ep attribute similarity is scored (0). Note that these two attributes, season number and episode number, are scored together as a single attribute since their combined matching is a far more probative of a match between a program metadata record and a content item or content series item metadata record than are individual season or episode attribute matches.

Scoring Date Attribute Similarity

If a program metadata air date is the same as (exact match) a content item metadata record original air date then the date similarity is scored as two (2).

If a program metadata air date is within some prescribed proximity (e.g., within one day of exact match) of a content item metadata record original air date then the date similarity is scored as one (1).

Also, if a program metadata record indicates that program content type includes a feature film, and where no program original air date is provided and there are no content item metadata records that indicate the Type, "full episode" content item episodes for this series but there are one or more clips for the series, then the date similarity is scored as one (1).

Otherwise, the date attribute similarity is scored (0).

Scoring Description Attribute Similarity

For each respective video match record, unless the description match is cancelled in accordance with the cancellation criteria set forth below, the episode description within a given program metadata record is compared with the episode description within a given audiovisual content item metadata record. In some embodiments, description comparison involves computing respective second progressive transformations of the program episode description string and of the given content item episode description string. A description (descr) attribute similarity score is computed as an integer representing the number of times that a word from the given transformed program episode description string appears in the given transformed content item episode description string.

Cancellation Criteria for Description Attribute Similarity Scoring

If any of the following are true, then cancel the description similarity scoring.

1. If a given program original air date is provided, and every "full length" content item in a given content item series has an original air date, and the program original air date does not match any of them, or 2. If program original air date is provided, and every "clip" content item in a given content item series has an original air date, and the program original air ate does not match any of them, or 3. There is no date match (date similarity score=0), and no Season/Episode number match (se-ep similarity score=0), and there is a content item episode title match (episode title similarity score=1 to 4) and the content item content.item. episode_title1 transformation is not unique across the other content.item. episode_title1 values (for content times of the same full/clip type) in this series, or 4. This is a clip with a date match.

The following explains operation of the selection module 220 of FIG. 2 and selection module 534 of FIG. 5B.

Producing Weighted Match Scores

Module 214 of FIG. 2 and modules 516 and 528 of FIGS. 5A-5B compute separate weighted match scores for respective metadata record attributes by multiplication of the respective attribute similarity scores by weighting factors according to the weights in the following Table 7.

TABLE 7

| Video Attribute | Weight |
|---|---|
| Video type | 10,000 |
| Video date | 5,000 |
| Video season no./episode no. | 2,500 |
| Video episode title | 500 |
| Video series title | 100 |
| Video description | 1 |

It will be appreciated from the above weighting scheme that date matches and season/episode matches carry more weight than episode matches. Moreover, episode title matches carry more weight than series title matches. The description match has a low weight and may serve as a tie breaker if it is even performed. As suggested by the description weighting, descriptions have been found to not be highly probative for comparisons. Note that the Type attribute is highly weighted due to a preference for "full" items as opposed to "clips" items. The rather extreme high weighting of Type causes every "full" item to be scored as a better match (at least in terms of raw numerical score) than all "clip" Type items. However, the Type attribute is not a true indicator of whether a particular program metadata record actually matches an item metadata record.

Discarding Certain Match Records from Consideration

The selection module 220 of FIG. 2 and the selection module 534 of FIG. 5B keep respective series match records and content item match records only if, (i.e. discard all other match records according to the following criteria):

1. Series content item match records that have a series title match similarity score greater than or equal to two (2);

2. Content item records (full Type or clip Type) that have a date match similarity score that is greater than zero (0);

3. Content item records (full Type or clip Type) that have a Season/Episode similarity scores greater than zero (0);

4. Content item records (full Type or clip Type) that have episode title match similarity scores greater than one (1).

Selection Criteria for Selecting a Match Record

The selection module 220 and the selection module 534 sort the series and video match records for a given currently selected program metadata record in descending order, based on their weighted match score values.

Within each "Type" subset of match records (Match match_type="series", "full", or "clip"), if there is only one match record with the highest weighted score value, mark it "Best In Type" (Match.rank=2). If instead there are multiple match records with the highest score value, mark them all as "Among the Best In Type" (Match.rank=3).

If there exists a "full" Type match record, which is Best In Type, then module 222 in FIG. 2 or module 536 in FIG. 5B associates the given currently selected program metadata record with a content item metadata record specified in that match record having "full" Type.

Otherwise, if there exists a "clip" Type match record which is Best In Type, then module 222 in FIG. 2 or module 536 in FIG. 5B associates the given currently selected program metadata record with a content item metadata record specified in that match record having "clip" Type.

Otherwise, if there is a "series" match which is Best In Type, then module 222 in FIG. 2 or module 536 in FIG. 5B associates the given currently selected program metadata record with a series content item metadata record specified in that match record having "series" match.

Otherwise there is no suitable Match for this Program.

Match Examples

Figure 8:
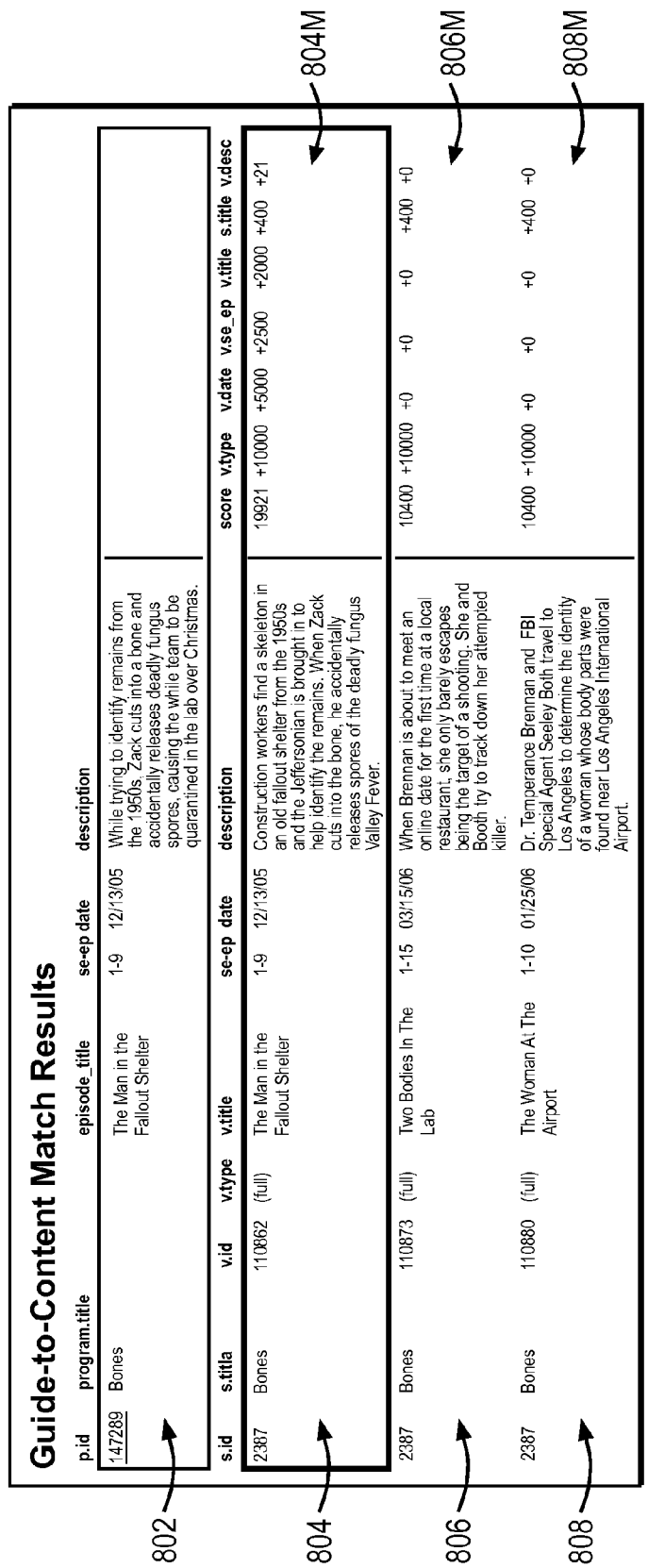
FIG. 8 is an illustrative drawing showing a first example program metadata record and multiple example content item metadata records and their corresponding content item match score records.

FIG. 8 is an illustrative drawing showing a first example program metadata record 802 on the top left and three example content item metadata records 804, 806 and 808 below on the left and three corresponding content item match score records 804M, 806M and 808M on the right. In this example, content item metadata record 804 would be selected as the best match since its match record 804M has the highest total score 19921. Content item match records 806M and 808M have identical scores of 10400. All three content item metadata records have the same Type, and therefore earn a scores of 10000 based upon Type match alone. All three content item records 804-808 have perfect series title matches (s.title), earning series title similarity score of four (4), which results in a weighted score of 400 (100×4) in their respective match records 804M-808M. The content item record 804M has perfect date match (v.date) (weighted score of 5000), season/episode match (v.se-ep) (weighted score 2,500) and episode match (v.title) (weighted score of 500×4=2000). In addition, content item record 804M has a score of 21 for its description match. In contrast, content item records 806M-808M earned zero (0) points each for their (v.date), (v.se-ep) (v.title) comparisons. Note that in this example, a perfect date match similarity is accorded a value of 1 rather than 2 as in some embodiments.

FIG. 9 is an illustrative drawing showing second example program metadata record 902 on the top left and several example content item metadata records 904-916 below on the left and several corresponding content item match score records 904M-916M on the right. In this example, multiple match records all have identical top scores of 10400. Thus, all of these are 'Among the Best In Type'. In accordance with the above selection criteria the "clip" content item metadata record 912 that has a score of 8400 in its content item record 912M would be selected to match the program metadata record 902.

The match records produced by the processes of FIG. 2 and FIGS. 5A-5B are maintained in computer readable device storage to permit inspection by persons who may want to assess the quality of the matches made using these processes. These persons also may wish to modify or override match determinations made by a process 200 or 500.

Alternative Transformation Levels and Similarity Measures

The following Table 8 provides alternate set of character string transformation levels and similarity measures in accordance with some embodiments. This alternate approach can provide a better differentiation between similarity measures which have close numeric values, for example Similarity Measure 1 and 2. Whereas before both would have had a similarity score of just 1, and they would have been indistinguishable.

TABLE 8

| Transformation Level | Similarity Measure | Description of Transformation |
| --- | --- | --- |
| Level 9 | 9 | Exact string match (original strings compared) |
| Level 7 | 7 | Ignore case, trim ends & remove redundant spaces |
| Level 5 | 5 | Keyword replacements & remove punctuation |
| Level 3 | 3 | Strip non-ascii chars, remove multi-char runs, and remove all spaces |
| Level 2 | 2 | Series/Episode Title includes Program Title |
| Level 1 | 1 | Program Title includes Series/Episode Title |
| Level 0 | 0 | No match |

Alternative Date Similarity Measures

The following Table 9 provides alternate date similarity measures in accordance with some embodiments.

TABLE 9

| Similarity Measure | Description of Date Proximity |
| --- | --- |
| 3 | Exact Date Match |
| 2 | Off-by-one Date Match |
| 1 | Special Cases |
| 0 | No Match |

Alternative Weightings

The following Table 10 provides alternate weightings in accordance with some embodiments. This alternative weighting embodiment avoid overlapping of scores of different attributes.

TABLE 10

| Video Attribute | Weight |
| --- | --- |
| Video type | 80,000 |
| Video date | 20,000 |
| Video season no./episode no. | 10,000 |
| Video episode title | 1,000 |
| Video series title | 100 |
| Video description | 1 |

User Interface

Figure 10:
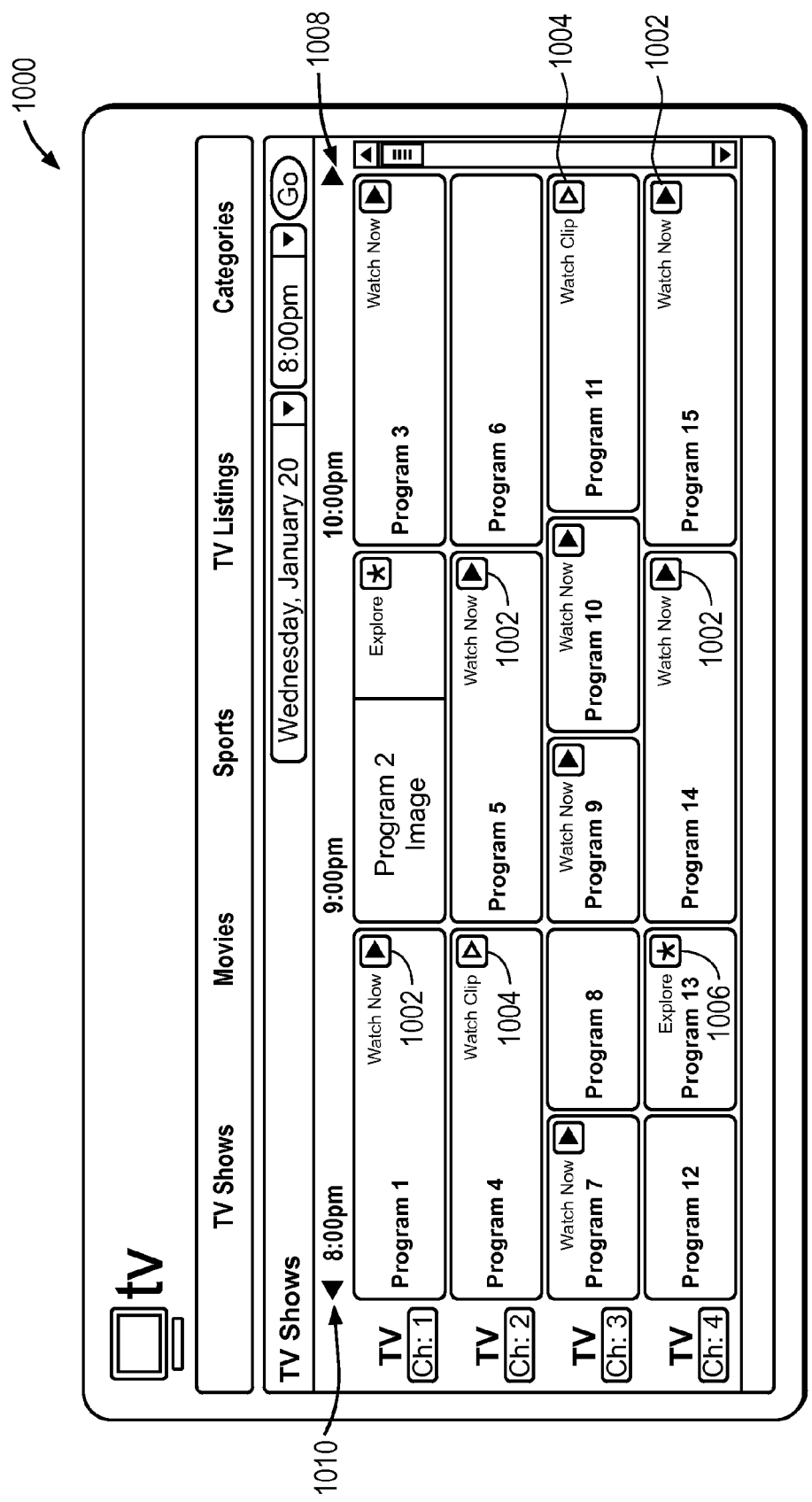
FIG. 10 is an illustrative drawing of an interactive user interface display including an image of a two-dimensional grid having multiple grid coordinate locations each identifying a program and each corresponding to a combination of a program provider and a scheduled program air time.

FIG. 10 is an illustrative drawing of an interactive user interface display, commonly known as an interactive program guide (IEPG), including an image of a two-dimensional grid 1000 having multiple grid coordinate locations each identifying a program and each corresponding to a combination of a program provider, channel or network and a scheduled program air time. A program guide display is rendered onto a display screen by a machine configured using instructions stored in a computer readable storage device to produce the guide image on the display. The guide display provides a persistent tangible representation of the grid that a user may reference to make content item selections. Program providers are identified on a vertical axis of the grid. Scheduled program air times are indicated on a horizontal axis of the grid. Two dimensional IEPG grids layouts are well known and provide an intuitive approach to locate programs based on channels and time slots. The grid's scheduled programs, their channels and time slots are assembled from information that generally is readily available from various Content Publishers.

Certain grid locations contain icons that identify programs and time slot combinations that are matched to a specific visual content item that is currently accessible for viewing. Specifically, for example, the grid coordinate location labeled "Program 1" contains a first 'Watch Now' icon 1002 to indicate that "Program 1" scheduled in the 8:00 PM to 9:00 M time slot is matched to a specific visual content item within a first category that is currently accessible for viewing. In some embodiments, the first category is a "full" video containing the corresponding program's content. Also, for example, the grid coordinate location labeled "Program 11" contains a second 'Watch Clip' icon 1004 to indicate that "Program 11" scheduled in the 10:00 PM to 11:00 PM time slot is matched to a specific visual content item from a second category that is currently accessible for viewing. In some embodiments, the second category is a video "clip" corresponding to corresponding program's content.

Certain other grid locations contain a third "Explore" icon 1006 to indicate programs matched to a specific series or collection comprising multiple different visual content items from the same content series that are currently accessible for viewing. In the example grid display, the grid coordinate location labeled "Program 13" contains the third 'Explore' icon 1006 to indicate that "Program 13" scheduled in the 8:30 PM to 9:00 M time slot is matched to a specific series or collection of visual content items that are currently accessible for viewing. The visual content items may comprise full video episodes corresponding to a program series or clips from a program series or both, for example.

A computing machine, such as a personal computer, set top box (STB) or cell phone, is configured to provide an association, reference or link that is encoded within a computer readable storage device between a respective grid coordinate location containing a first 'Watch Now' icon 1002 and a respective first identifier that indicates a source from which the specific visual content item matched to the program identified by that grid location can be obtained. The computing machine also is configured to provide an association encoded within the storage device between a respective grid coordinate location containing a second 'Watch Clip' icon 1004 and a respective second identifier that indicates a source from which the specific visual content item matched to the program identified by that grid location can be obtained. Further, the computing machine is configured to provide an association encoded within a computer readable storage device between a respective grid coordinate location containing a third 'Explore' icon 1006 and a respective third identifier that indicates a source from which a menu to select from among the series or collection of visual content items.

The identifiers, which are also encoded in computer readable storage, are indicative of storage device locations where specific designated content items matched to the identified programs can be obtained. A storage device may comprise a local disk or a server accessible over the Internet via a web browser or a database location accessible over a storage area network, for example. The identifiers may be URLs or FTP addresses if the content item is to be retrieved from the Internet, for example. The identifiers may be a file addresses if the content items are to be obtained from disk storage or a database location if the content item is to be retrieved from a database location, for example. Some combination of identifier types may be provided if different content items are accessible from multiple different kinds of locations.

Table 11 is an example of a list of identifiers corresponding to the first 'Watch Now' icon associated with Program 1, to the second 'Watch Clip' icon associated with Program 11 and to the third 'Explore' icon of Program 13 that are stored in a computer readable storage device that correspond to the grid locations shown on the gird of FIG. 10. It will be appreciated that identifiers are stored for other grid locations having first, second or third icons, but in the interest of conciseness only these three are shown.

TABLE 11

| Grid Location | Stored Identifier |
|---|---|
| Program 1 | Identifier 1 |
| Program 11 | Identifier 11 |
| Program 13 | Identifier 13 |

The machine is configured to permit a user to retrieve a visual content item that corresponds to the grid location of a program that the user wants to view. For example, the machine may be configured to permit a user to actuate a point and click device such as a mouse device or operate a remote control device or to flip a mechanical switch or use a touch screen or voice command system to select a grid location and thereby retrieve from storage a content item associated with that location. In response to the selection, the machine delivers a first category (e.g., full length or clip) of content if the grid location contains a first icon. The machine delivers a second category of content if the grid location contains a second icon. The machine delivers a selection or menu of content items if the grid location contains a third icon.

A forward shift (to the right) scroll control arrow icon 1008 is actuated to effect scrolling forward in time to view programs scheduled to air in the future. A backward shift (to the left) scroll control arrow icon 1010 is actuated to effect scrolling backward in time to view programs scheduled to air in the past. Thus, for example, a user can use the scroll controls to scroll the grid to view a grid location identifying a previously aired program. If a first icon is disposed on the grid location for the desired program, then the user can select the program and obtain and view a first category (e.g., full video) content item matched to the previously aired program. If a second icon is disposed on the grid location for the desired program, then the user can select the program and obtain and view a second category (e.g., video clip) content item matched to the previously aired program. If a third icon is disposed on the grid location for the desired program, to obtain a menu of content items (e.g., video episodes and/or video clips)) from a series matched to the program.

Therefore, a viewer can advantageously use the grid 1000 to navigate to a desired grid location, corresponding to a past time or a to a future time, that identifies a particular program, and to then access a visual content item matched to the program without the need for additional probing or searching or analysis to determine whether the content item is truly the one that matches the scheduled program. The ability to scroll backwards in time allows viewers to find and watch the proverbial show that aired last night or even last week or before, that everyone else is talking about but that they missed. The matching of program metadata records with content item metadata records according to the process 200 of FIG. 2 or according to the alternate process 500 of FIGS. 5A-5B can be used to confidently designate which specific audiovisual content items are the best matches with scheduled programs, thus saving the viewer the hassle of figuring that out for himself.

Constructing an EPG Grid to Access Audiovisual Content Items

Figure 11:
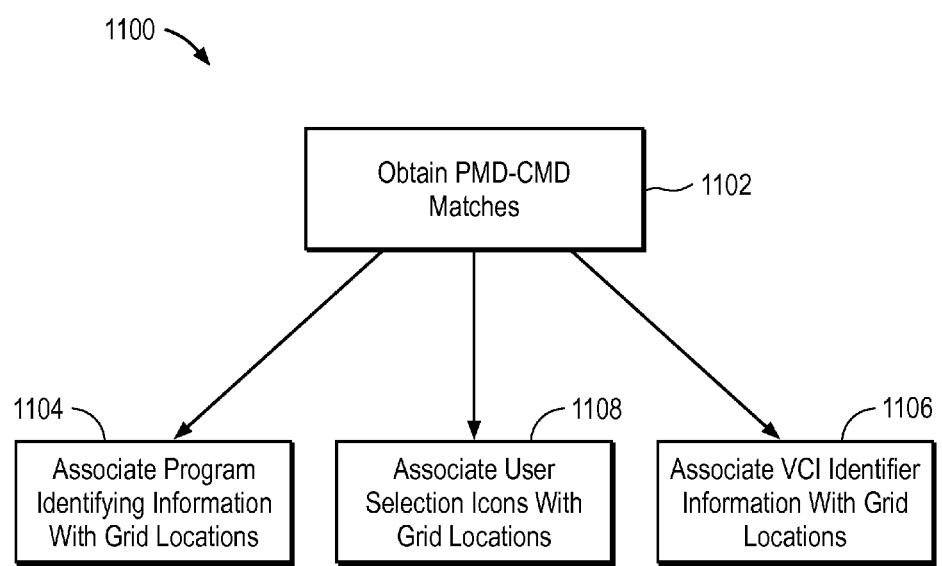
FIG. 11 is an illustrative flow diagram representing a process to create an EPG grid having associations with specific audiovisual content items that are available for viewing.

FIG. 11 is an illustrative flow diagram representing a process 1100 to create an EPG grid having associations with specific audiovisual content items that are available for viewing. The flow diagram of FIG. 11 includes multiple modules, each representing an aspect of the process 1100 that configures machine to perform a specified function of such module. Module 1102 configures a machine to determine correlations between program metadata records and audiovisual content metadata records. In essence, module 1102 performs the role of process 200 of FIG. 2 or of process 500 of FIGS. 5A-5B. Module 1104 configures the machine to associate program identifiers such as program names or program logos or program images with grid locations associated with the different programs. As such, module 114 performs a conventional well known function. Module 1106 configures a machine to associate an identifier that can be used to access a content item with a grid location identifying the program that has been associated with the item by the process of module 1102. Module 1108 configures the machine, based upon the match results determined by module 1102, to associate first, second or third icons with grid locations associated with specific first category content items, specific second category content items and series of content items, respectively.

Dispatching User Requests for Audiovisual Content Items

Figure 12:
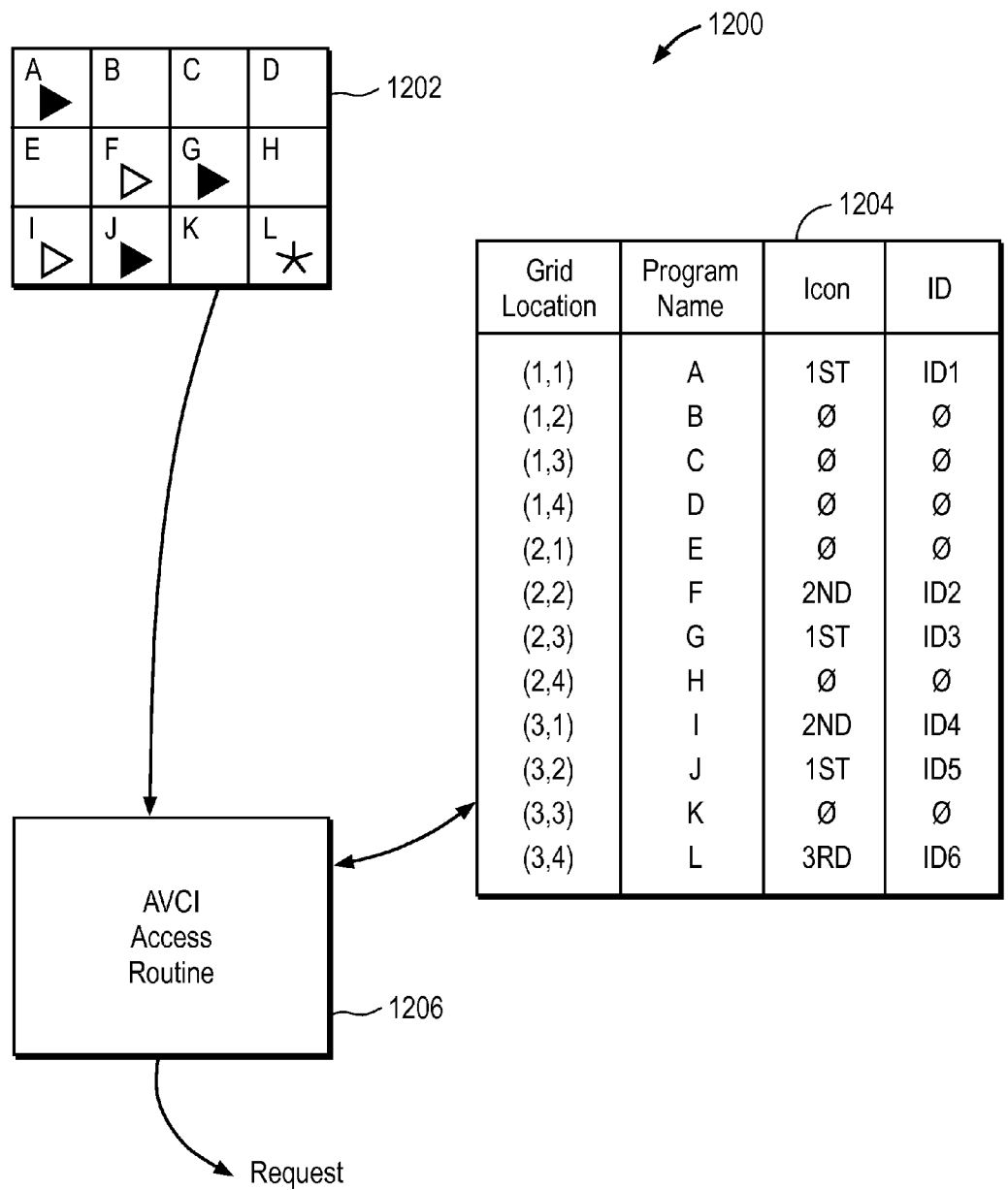
FIG. 12 is an illustrative flow diagram representing a process to dispatch a user request made through a program grid to access audiovisual content items.

FIG. 12 is an illustrative flow diagram representing a process 1200 to dispatch a user request made through a program grid to access audiovisual content items. The flow diagram of FIG. 12 includes multiple modules, each representing an aspect of the process 1200 that configures machine, e.g., a computer processor to perform a specified function of such module. A grid 1202 produced includes program identifiers indicated by letters "A" through "L" in grid locations (1,1) through (3,3) as shown. Module 1102 of FIG. 11 is used in some embodiments to associate program identifiers with grid locations. The grid 1202 includes first icons associated with program "A", "C" and "J"; includes second icons associated with programs "F" and "I"; and includes a third icon associated with program "L". Module 1108 of FIG. 11 is used in some embodiments to associated the first, second and third icons with different programs in different gird locations.

A data structure, specifically a table, 1204 correlates grid locations with icon types and request identifiers. Module 1106 of FIG. 11 is used in some embodiments to produces the data structure 1204. In the example data structure 1204 encoded in storage, indicates that grid location (1,1) is associated with the first icon type and a request identifier ID1. The data structure indicates that grid locations (1,2) through (2,1), (2,4) and (3,3) are not associated with any icons. Grid location (2,2) is associated with the second icon and request identifier ID2. Grid location (2,3) is associated with the first icon and request identifier ID3. Grid location (3,1) is associated with the second icon and request identifier ID4. Grid location (3,2) is associated with the first icon and request identifier ID5. Grid location (3,4) is associated with the third icon and request identifier ID6.

An audiovisual content item (AVCI) access module 1206 configures a machine to request audiovisual content items in response to user request. The grid 1202 acts as a UI in which a user selects a grid location that identifies a program the user wishes to view. The program identifiers "A" to "L" inform the user of scheduled programs. The icons inform the user of which programs correspond to matched content that is currently available to view. The user selects a grid location that has a coordinate (1,1) to (3,4). The AVCI access module 1206 uses the grid coordinate information to retrieve icon information and identifier information from the data structure 1204. The AVCI generates a request for audiovisual content item or a menu of items based upon the information retrieved from the data structure 1204. The nature of the requests depends upon the context in which the process 1200 is performed. Details of the ACVI process 1206 are provided below with reference to FIG. 16.

Delivering a Grid UI and Content Item Identifier Information Over a Network

Figure 13:
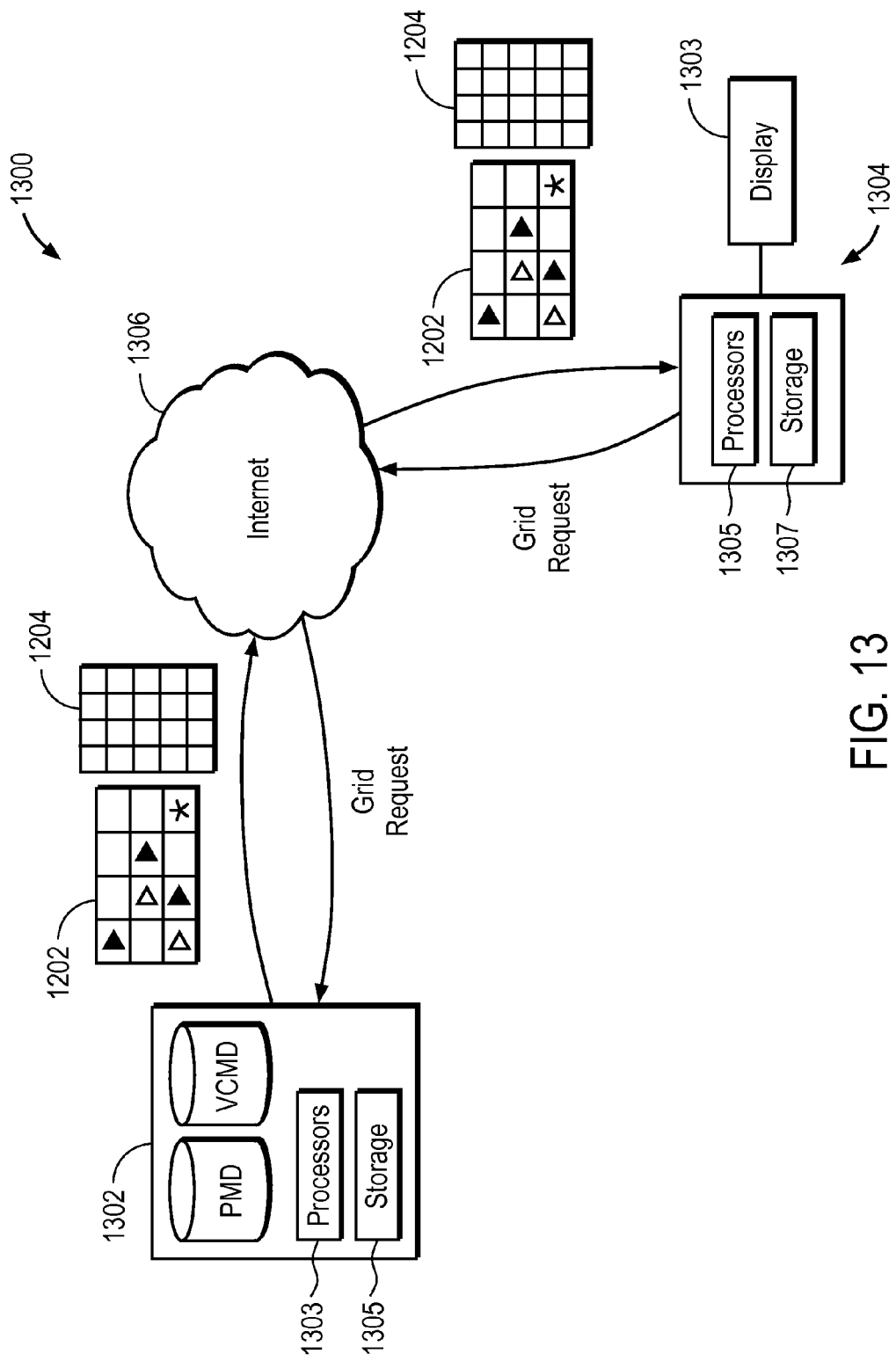
FIG. 13 is an illustrative drawing of a network system to deliver a user interface grid and content item identifier information to a user machine.

FIG. 13 is an illustrative drawing of a network system 1300 to deliver a user interface grid and content item identifier information to a user machine. A server system 1302, which includes one or more processors 1303 and storage devices 1305 such as RAM and persistent memory, is configured to perform the functions of the process 1100 of FIG. 11 to generate the grid 1202 and data structure of FIG. 12. It will be appreciated that the different modules of process 1100 may be performed on one or more different physical or virtual machines, perhaps at different physical locations. A user machine 1304 that includes a display 1303, one or more processors 1305 and computer readable storage 1307 such as RAM or a persistent storage device and a display makes a grid request of the internet 1306 to the server system 1302 for the grid 1202 or for a refresh of the grid. It will be appreciated that the processes 200 of FIGS. 2 and 500 of FIGS. 5A-5B typically run frequently if not continually, and that they regularly generate new matches between programs and content items. Therefore, the match information of a grid previously obtained by the user device 1304 soon becomes out of date and must be regularly updated or refreshed. Of course, it will be appreciated that grid refresh may be initiated by the server system 1302 rather than the user system 1304. For example, the server system 1302 may schedule regular refresh sessions with registered user machines such as machine 1304. Regardless of who makes initiates the grid update, the server system 1302 sends over the Internet 1306 to the user device the information to generate a grid UI such as grid UI 1202 of FIG. 12 and corresponding request identifier information such as that in the data structure 1204 of FIG. 12.

Figure 14:
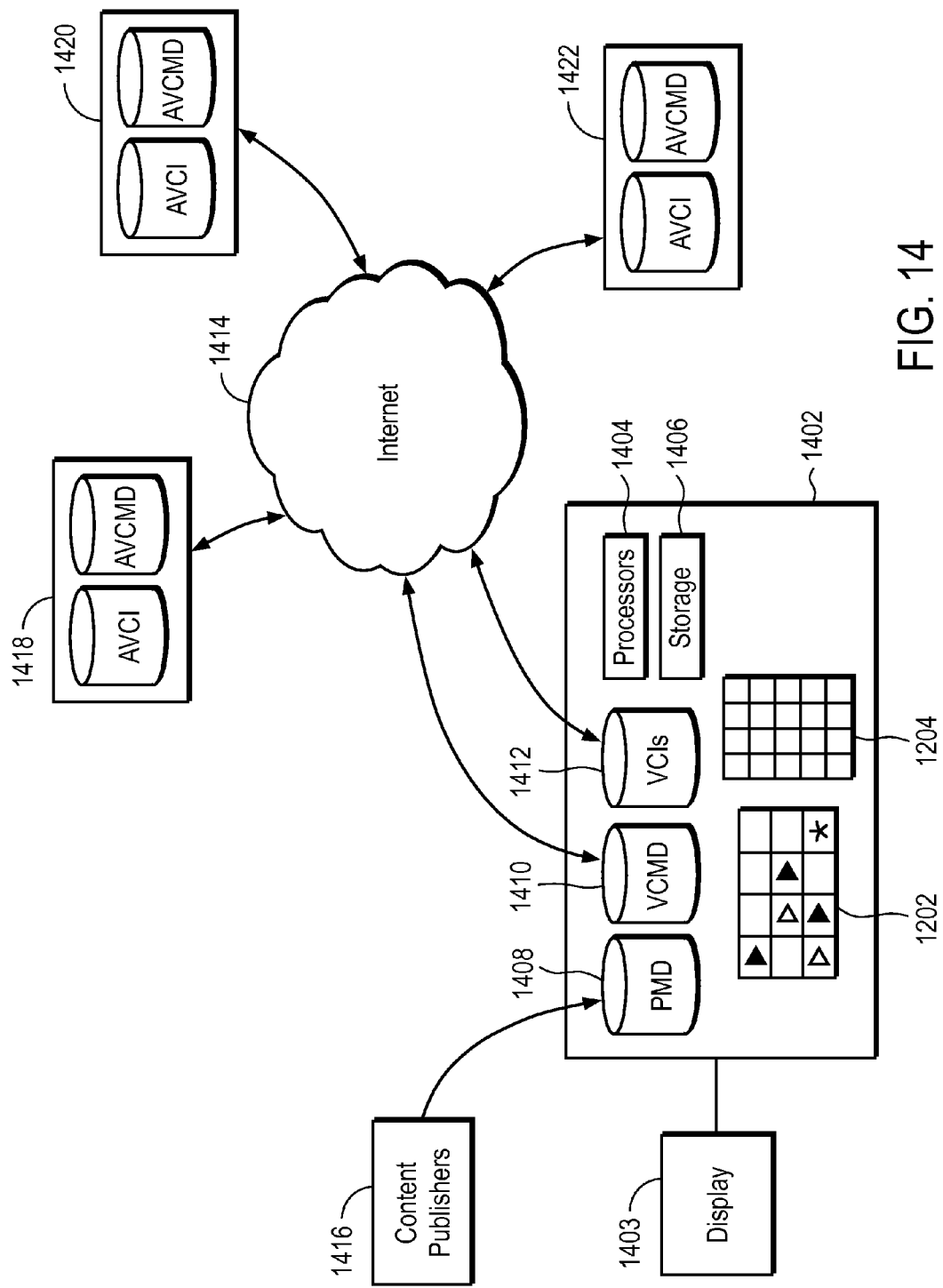
FIG. 14 is an illustrative drawing of a machine to generate a user interface grid and content item identifier information for use locally by the machine.

Machine to Update Match Content, UI Grid and Identifier Data Structure and Pre-Load Audiovisual Content Items Associated with the UI Grid FIG. 14 is an illustrative drawing of a machine to generate a user interface grid and content item identifier information for use locally by the machine. Machine 1402 which includes a display 1403, one or more processors 1404 and a computer readable storage device 1406 such as a RAM or a persistent memory device may be a personal computer, set top box, server or cell phone, for example. The machine includes one or more storage devices 1408 that store program metadata and one or more storage devices 1410 that store audiovisual content item metadata. The machine 1410 is configured periodically to perform the process 200 of FIG. 2 or the process 500 of FIGS. 5A-5B to identify matches between programs and content items. The machine 1402 also is configured periodically to perform the process of 1100 of FIG. 11 that can be used to produce or refresh the UI grid 1202 and the identifier bearing data structure 1204 of FIG. 12. The one or more storage devices of the machine 1402 include one or more storage devices 1412 that store actual video content items that have been downloaded from sources on a network such as the Internet 1414.

Figure 15:
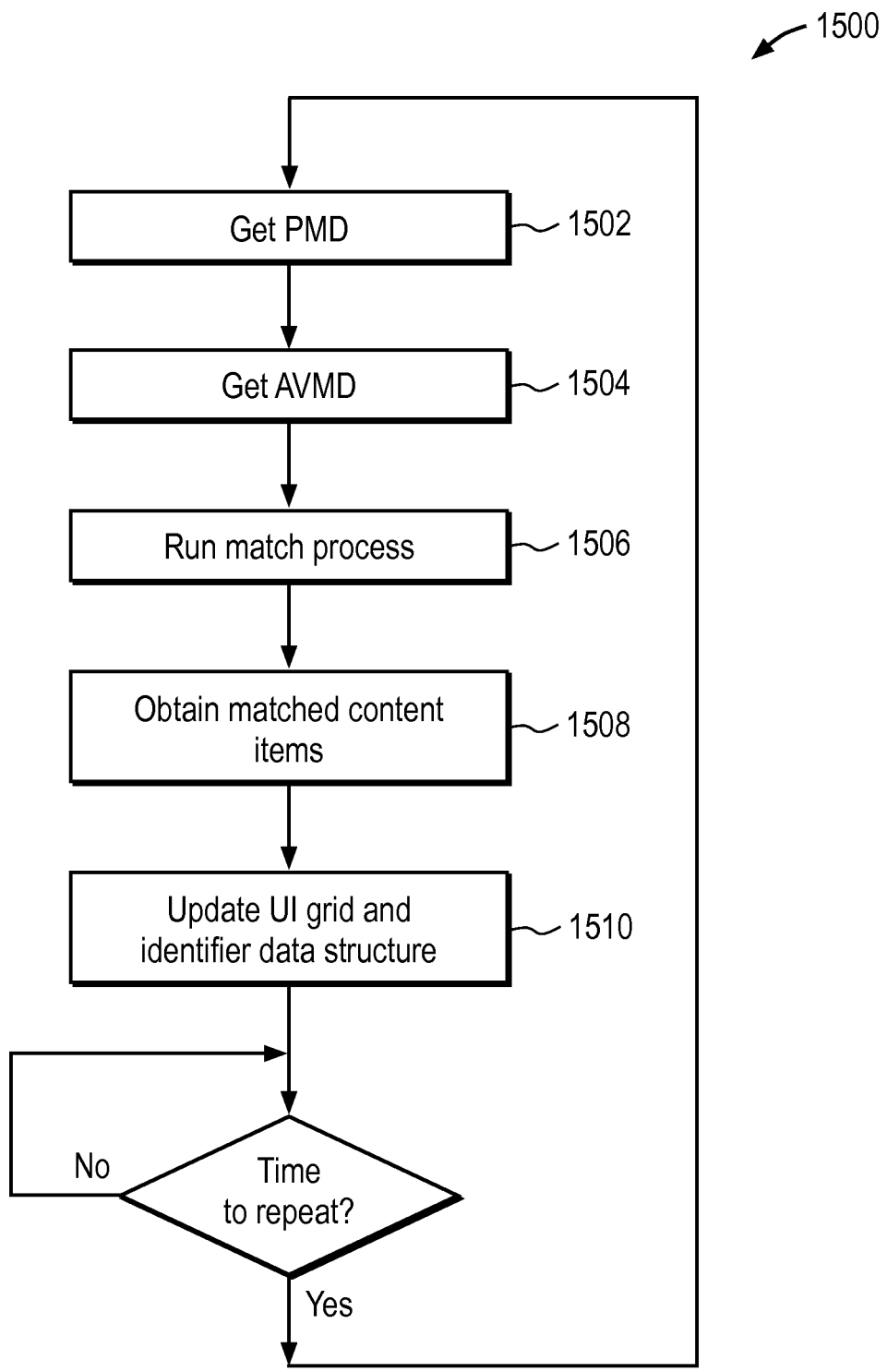
FIG. 15 is an illustrative flow diagram representing a process that the machine of FIG. 14 is configured to perform.

FIG. 15 is an illustrative drawing representing a process that the machine 1402 of FIG. 14 is configured to perform. The flow diagram of FIG. 15 includes a plurality of modules, each representing an aspect of the process 1500 that configures machine to perform a specified function of such module. Module 1502 configures the machine 1402 to obtain updated program metadata from program sources such as Content Publishers 1416. Module 1504 configures the machine 1402 to obtain updated audiovisual content item metadata (AVMD) over a network such as the Internet from various sources 1418, 1420 and 1422, which may be such as content aggregators, for example. Module 1506 configures the machine 1402 to run process 200 or process 500 in order to identify new best matches between programs and content items. Module 1508 configures the machine 1402 to obtain from one or more sources 1418, 1420 and 1422, audiovisual content items (AVCIs) determined by module 1506 to match programs that appear or that are to appear in the UI grid 1202. Module 1510 runs the process 1100 to update the UI grid 1202 and to update the data structure 1204. However, note that the identifiers in the data structure 1204 identify locations in storage 1412 where pre-loaded video content can be obtained.

Requesting Content Item in Response to User Selection of UI Grid Location

Figure 16:
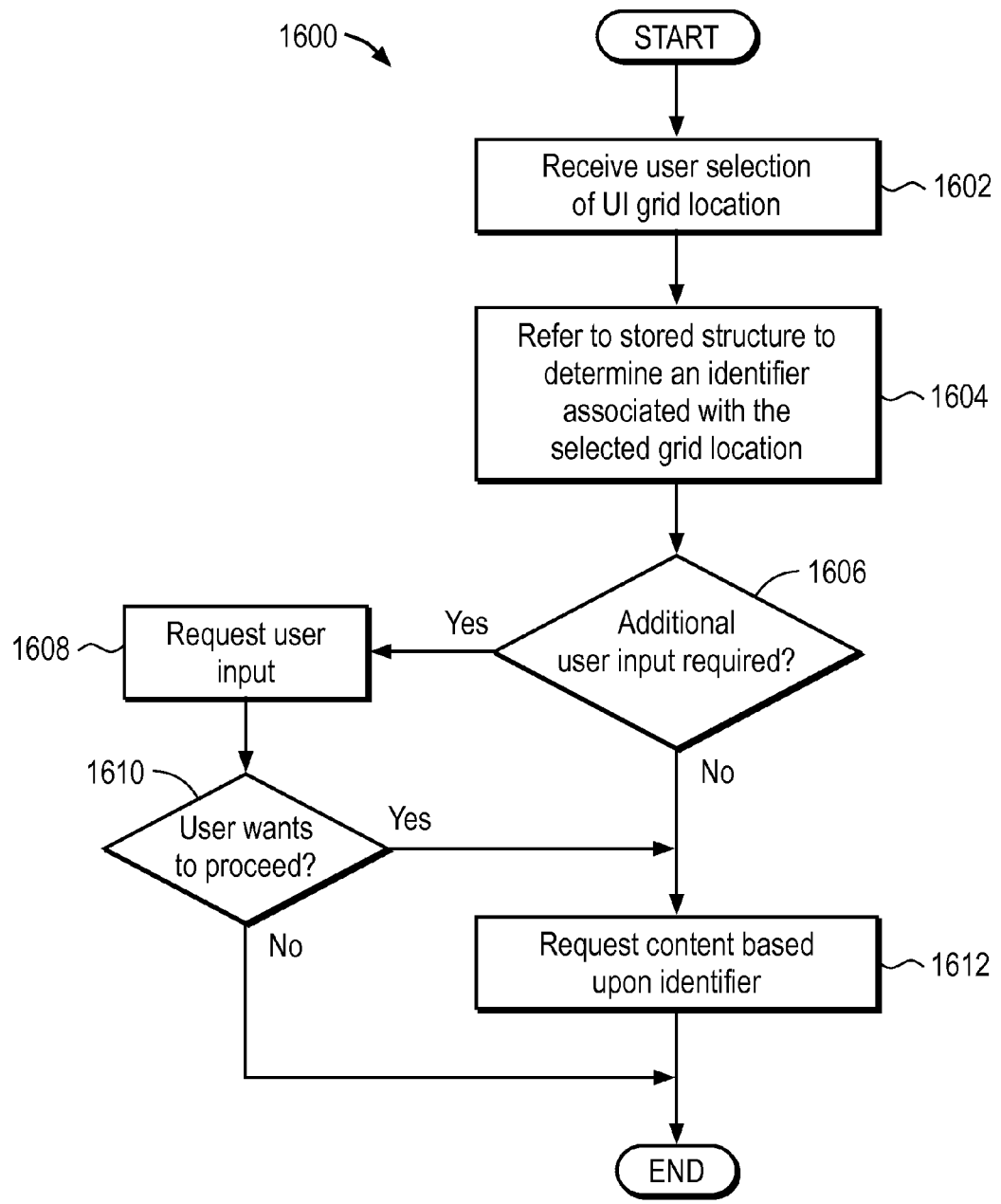
FIG. 16 is an illustrative flow diagram representing a process to access audiovisual content in response to a user selection of a UI grid location.

FIG. 16 is an illustrative flow diagram representing a process 1600 to access audiovisual content in response to a user selection of a UI grid location. The flow diagram of FIG. 16 includes a plurality of modules, each representing an aspect of the process 1600 that configures machine to perform a specified function of such module. The modules are implemented using computer program codes stored in a computer readable storage device. The process 1600 represents details of the ACVI access routine 1206 of FIG. 12. Module 1602 configures a machine to receive a user selection of a UI grid location. Module 1604 configures the machine to refer to a stored data structure to determine an identifier associated with the selected location. The identifier indicates where the content item can be obtained, such as a web page that can stream the content, a network address to which an FTP request can be made for the content or a local storage location, for example. Decision module 1606 configures the machine to determine whether additional user input is required. It will be appreciated that the data structure 1204 contains information that may be used to determine what if any additional user input might be required. For example, if the requested content item involves adult content, then a warning and parental consent may be required. Alternatively, for example, if a surcharge is required for the content, then the user may be required to agree to pay. If decision module 1606 determines that user input is required, then module 1608 configures the machine to request the additional user input. Decision module 1610 configures the machine to determine whether the user wishes to proceed. If not, then the process ends. If yes, then module 1612 configures the machine to request the content item that corresponds to the selected grid location. based upon the identifier determined by module 1604. referring again to decision module 1606, if no additional user input is required, then control flows directly to module 1612 which requests the content using the identifier.

Figure 17:
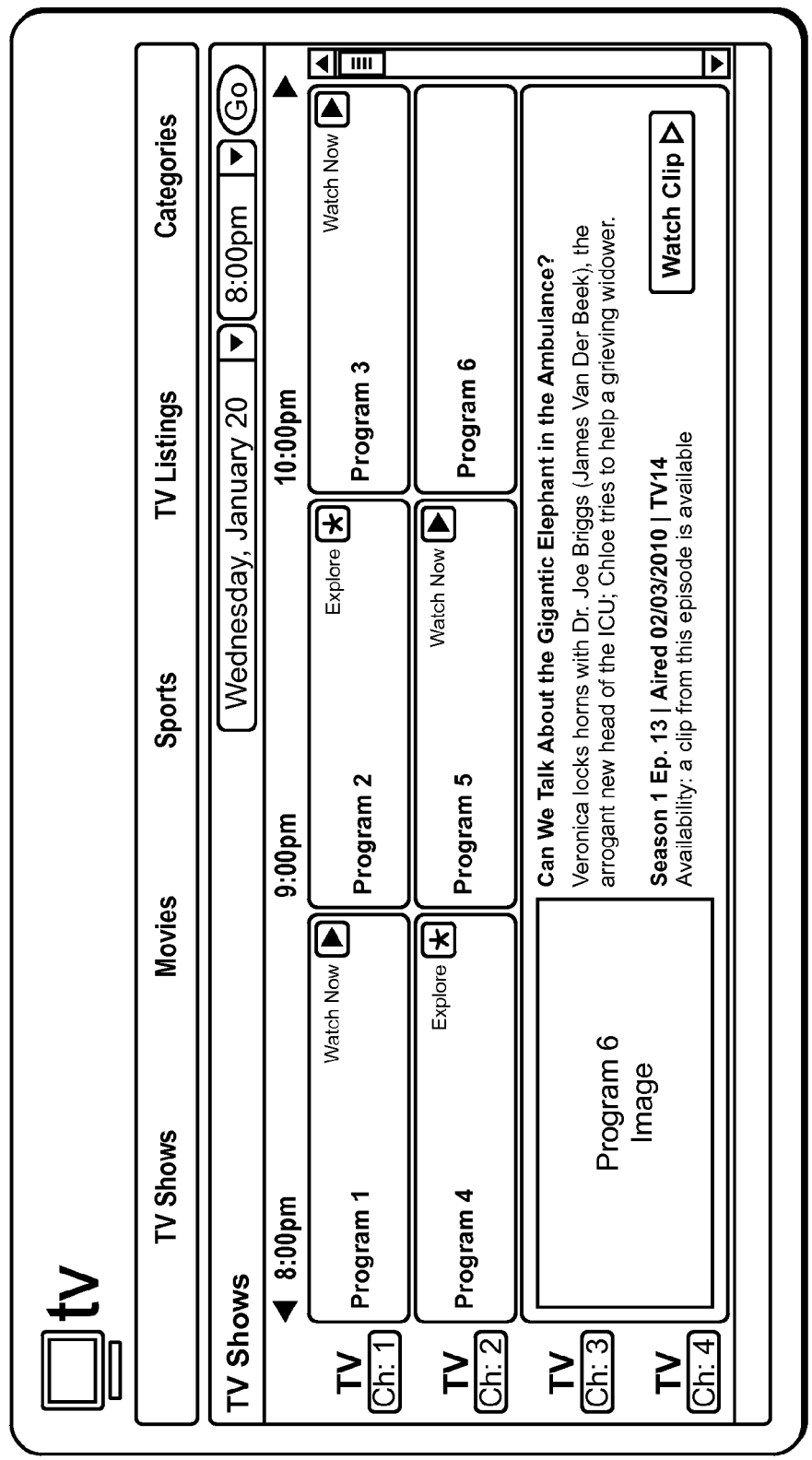
FIG. 17 is an illustrative drawing of an example UI grid that appears after a user already has selected a grid location in accordance with some embodiments.

FIG. 17 is an illustrative drawing of an example UI grid that appears after a user already has selected a grid location in accordance with some embodiments. Referring to both FIGS. 16 and 17, in response to the selection, module 1608 of process 1600 of FIG. 16 causes an enlarged display of an Program 6 Image and sets forth certain metadata describing the content item. The module 1608 also causes display of a 'Watch Clip' button. If the user actuates the button, the decision module 1610 causes module 1612 to use the identifier corresponding to the grid location for Program 6 to retrieve the content item. It will be appreciated that the program code to implement modules of FIG. 16 may be stored in a storage device of a machine 1304 of FIG. 13 or machine 1404 of FIG. 14.

Figure 18:
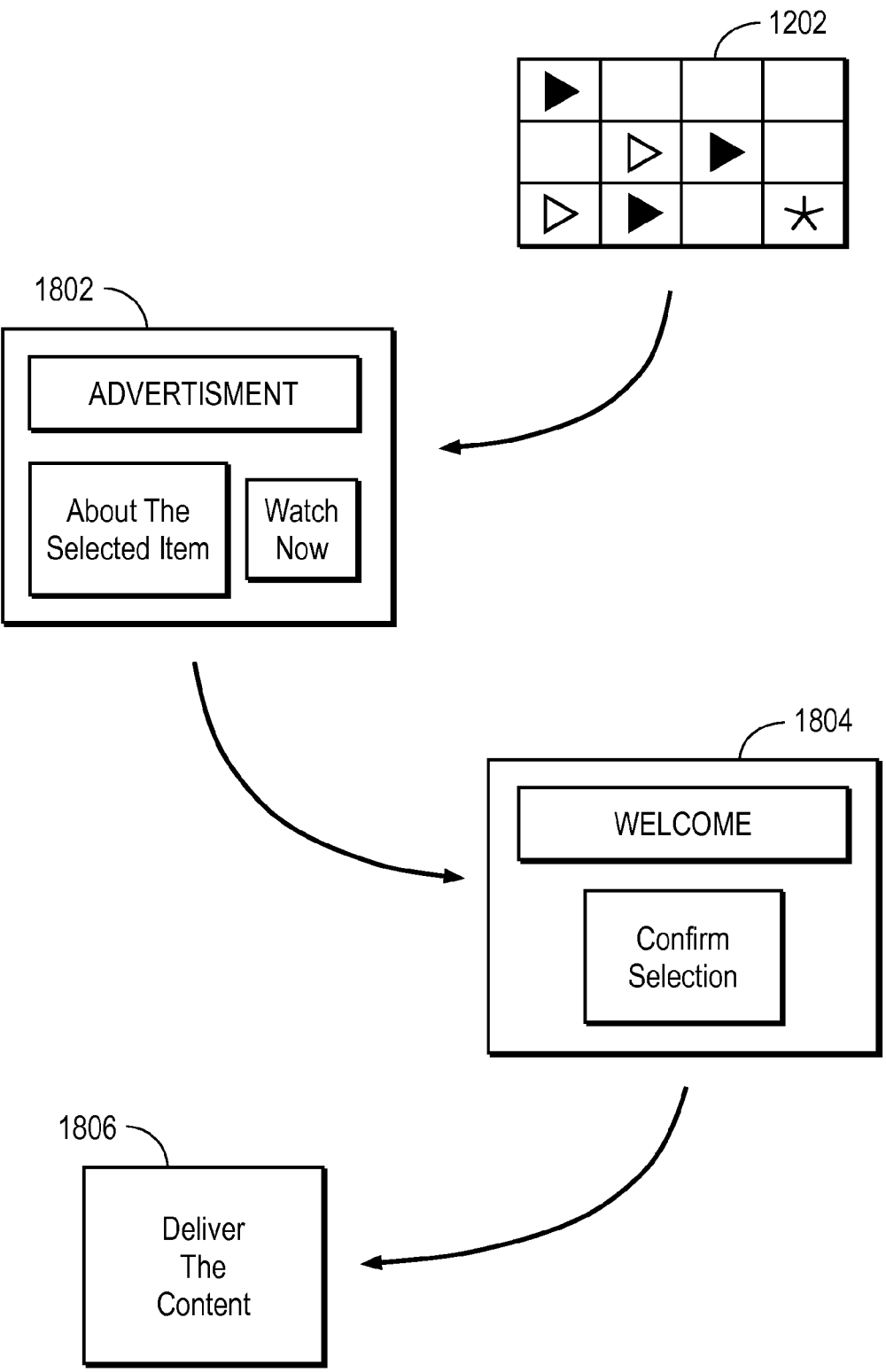
FIG. 18 is an illustrative drawing representing flow of control among web pages following a user selection of a UI grid location in accordance with some embodiments.

FIG. 18 is an illustrative drawing representing flow of control among web pages following a user selection of a UI grid location in accordance with some embodiments. Assume that a user selects one of the grid locations that contains a first or second icon (represented by a shaded or clear arrow respectively). Referring to both FIGS. 16 and 18, further assume that decision module 1606 of determines that additional user input is required. In this example, rather than displaying additional information on the grid as in FIG. 17, module 1606 causes the user's machine to be 'taken' to a second web page 1802 (different from the web page displaying the UI grid) that offers advertisements and provides metadata about the content item, for example, and that also requests confirmation that the user wants to 'Watch Now'. That web second page 1802 is within the purview of process 160, however. Assuming the user indicates a desire to 'Watch Now' on the second web page 1802, the module 1612 uses the identifier determined by module 1604 to request a third web page 1804, outside the purview of process 160 and likely that of a third party. That third web page 1808 may include welcoming information, and perhaps some more ads, or may request payment, for example. The third web page 1808 typically will request confirmation from the user that the content item is to be delivered. Assuming that the user indicates a desire to receive the content item, the content is delivered as indicated by block 1806. It will be appreciated that the program code to implement modules of FIG. 16 may be stored in a storage device of a machine 1304 of FIG. 13 or machine 1404 of FIG. 14.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method, for use with a machine that includes a display screen, to obtain visual content items matched to scheduled programs comprising:

providing on the display screen a program guide display that includes a grid with grid locations that identify scheduled programs, and that correspond to respective scheduled program times and to respective scheduled program sources;

wherein the program guide display extends over a time frame prior to the current date;

a data structure stored in a computer readable storage device that respectively, associates each of one or more respective grid locations of the program guide display with a respective icon that indicates availability of a respective visual content item that is matched to a respective scheduled program identified in the respective grid location of the program guide display and that is currently available from a respective source other than a respective scheduled program source identified in the respective grid location of the program guide display, and associates a respective storage device location identifier with a respective grid location of the program guide display that indicates a respective storage device location where a respective visual content item matched to a respective scheduled program can be obtained, wherein at least one storage device location identifier associated with grid locations of the program guide display indicates a source of a menu from which to select from among a series of visual content items associated with the respective grid location;

displaying the respective icon in each of the one or more respective grid locations of the program guide display associated in the data structure with the respective icon to indicate that the respective visual content item matched in the data structure to each such respective grid location of the program guide display currently is available from a respective source other than a respective scheduled program source identified in the respective grid location of the program guide display; and in response to a user selection of a respective grid location of the program guide display that displays the respective icon, accessing a respective menu and selecting from among a series of visual content items associated with the respective grid location to obtain a respective visual content item associated in the data structure with the respective selected grid location.

2. The method of claim 1 further including:
obtaining user confirmation of a selection prior to accessing.

3. The method of claim 1 further including:
providing on the display screen additional information concerning the selected content item prior to accessing; and
obtaining user confirmation of a selection prior to accessing.

4. The method of claim 1 further including:
displaying on the display screen an advertisement prior to accessing.

5. The method of claim 1 further including:
displaying on the display screen an advertisement prior to accessing; and
obtaining user confirmation of a selection prior to accessing.

6. The method of claim 1,
wherein respective visual content items matched to respective scheduled programs identified by such respective grid locations currently are available through streaming from respective internet web locations; and
wherein accessing includes streaming a respective visual content item from a respective internet web location.

7. The method of claim 1,
wherein respective visual content items matched to respective scheduled programs identified by such respective grid locations currently are available through downloading from respective web locations; and
wherein accessing includes downloading a respective visual content item from a respective internet web location.

8. The method of claim 1,
wherein the respective visual content items matched to respective scheduled programs identified by such respective grid locations currently are available through downloading from respective FTP locations; and
wherein accessing includes downloading a respective visual content item from a respective FTP location.

9. The method of claim 1,
wherein the respective visual content items matched to respective scheduled programs identified by such respective grid locations currently are available through retrieval from a database; and
wherein accessing includes retrieving a respective visual content item from the database.

10. The method of claim 1,
wherein the respective visual content items matched to respective scheduled programs identified by such respective grid locations currently are available through a local storage system; and
wherein accessing includes retrieving a respective visual content item from the local storage system.

11. The method of claim 1 further including:
delivering a data structure over a network to update the grid;
wherein the data structure indicates respective icon associations with respective grid locations.

12. The method of claim 1 further including:
delivering a data structure over a network to update the grid;
wherein the data structure indicates respective identifier associations with respective grid locations.

13. The method of claim 1,
wherein providing respective icons respectively associated with respective grid locations includes:
providing a first icon associated with one or more respective grid locations to indicate that respective episode visual content items matched to respective scheduled programs identified by respective grid locations associated with the first icon currently are available; and
providing a second icon associated with one or more respective grid locations to indicate that respective clip visual content items matched to respective scheduled programs identified by respective grid locations associated with the second icon currently are available.

14. The method of claim 1,
wherein providing respective icons respectively associated with respective grid locations includes:
providing a first icon associated with one or more respective grid locations to indicate that respective episode visual content items matched to respective scheduled programs identified by respective grid locations associated with the first icon currently are respectively available; and
providing a third icon associated with one or more respective grid locations to indicate that respective collections of multiple visual content items matched to respective scheduled programs identified by respective grid locations associated with the third icon currently are respectively available.

15. The method of claim 1,
wherein providing respective identifiers that are encoded in one or more computer readable storage devices includes:
providing different respective identifiers that are associated with different respective content items.

16. The method of claim 1,
wherein providing respective icons respectively associated with respective grid locations includes:
providing a first icon associated with one or more respective grid locations to indicate that respective episode visual content items matched to respective scheduled programs identified by respective grid locations associated with the first icon currently are available; and
providing a second icon associated with one or more respective grid locations to indicate that respective clip visual content items matched to respective scheduled programs identified by respective grid locations associated with the second icon currently are available; and
wherein providing respective identifiers that are encoded in one or more computer readable storage devices includes:
providing different respective identifiers that are associated with different respective content items.

17. The method of claim 1,
wherein providing respective icons respectively associated with respective grid locations includes:
providing a first icon associated with one or more respective grid locations to indicate that respective episode visual content items matched to respective scheduled programs identified by respective grid locations associated with the first icon currently are respectively available; and
providing a third icon associated with one or more respective grid locations to indicate that respective collections of multiple visual content items matched to respective scheduled programs identified by respective grid locations associated with the third icon currently are respectively available; and
wherein providing respective identifiers that are encoded in one or more computer readable storage devices includes:
providing different respective identifiers that are associated with different respective content items.

18. The method of claim 1, wherein the program guide display extends over a time frame to include programs scheduled subsequent to the current date.

19. The method of claim 18, further comprising:
providing respective icons respectively associated with respective grid locations for time frames subsequent to the current date, the icons indicating that visual content items matched to respective scheduled programs scheduled prior to the current date or subsequent to the current date are currently available.

20. The method of claim 19, wherein the visual content items matched to respective scheduled programs scheduled prior to the current date or subsequent to the current date include one or more of full-length episodes matched to the respective programs and video clips matched to the respective programs.

21. The method of claim 1 further including:
periodically updating the data structure to change one or more respective indications of respective storage device locations where respective visual content items matched to respective scheduled programs can be obtained.

\* \* \* \* \*